US012398678B2

(12) United States Patent
Schenk et al.

(10) Patent No.: US 12,398,678 B2
(45) Date of Patent: Aug. 26, 2025

(54) MOTOR AND MOTOR CONTROLLER THERMAL MANAGEMENT FEATURES

(71) Applicants: Rolls-Royce Corporation, Indianapolis, IN (US); Rolls-Royce North American Technologies, Inc., Indianapolis, IN (US)

(72) Inventors: Peter Schenk, Indianapolis, IN (US); Mathew Hill, Indianapolis, IN (US); Jacob Ward Harral, Indianapolis, IN (US); Michael Joseph Kabbes, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 18/360,891

(22) Filed: Jul. 28, 2023

(65) Prior Publication Data

US 2025/0035045 A1 Jan. 30, 2025

(51) Int. Cl.
*F02C 7/262* (2006.01)
*F02C 7/12* (2006.01)

(52) U.S. Cl.
CPC ............... *F02C 7/262* (2013.01); *F02C 7/12* (2013.01)

(58) Field of Classification Search
CPC .... F02C 7/262; F02C 7/25; F02C 7/12; F01D 25/12; F01D 25/14; H05K 7/20845; H05K 7/2089
See application file for complete search history.

(56) References Cited

U.S. PATENT DOCUMENTS

| | | | |
|---|---|---|---|
| 2,971,334 A | * | 2/1961 | Carlson ............... F02C 3/06 60/726 |
| 5,129,221 A | | 7/1992 | Walker et al. |
| 5,442,907 A | | 8/1995 | Asquith et al. |

(Continued)

FOREIGN PATENT DOCUMENTS

| | | |
|---|---|---|
| CN | 106257824 B | 6/2021 |
| EP | 2000648 B1 | 12/2008 |

(Continued)

OTHER PUBLICATIONS

Rajapakshe, "Heat Storage Application in Electric Motor Cooling System: Smoke Ventilation Motors", University of Gavle, Jan. 2014, 105 pp., Retrieved from the Internet on Aug. 23, 2023 from URL: https://www.diva-portal.org/smash/get/diva2:690457/FULLTEXT01.pdf.

(Continued)

*Primary Examiner* — Thomas P Burke
(74) *Attorney, Agent, or Firm* — Shumaker & Sieffert, P.A.

(57) ABSTRACT

A system includes a gas turbine engine configured to provide propulsion to an aircraft and a starter system configured to start the gas turbine engine. The starter system comprises a motor controller and a closed-loop cooling system configured to cool the motor controller during an emergency in-flight restart operation of the gas turbine engine. The closed-loop cooling system includes a cooling fluid reservoir containing cooling fluid. The cooling fluid is configured to receive thermal energy from the motor controller during the emergency in-flight restart operation of the gas turbine engine.

19 Claims, 10 Drawing Sheets

(56) References Cited

U.S. PATENT DOCUMENTS

| | | | |
|---|---|---|---|
| 5,712,802 A | 1/1998 | Kumar et al. | |
| 5,845,483 A | 12/1998 | Petrowicz | |
| 7,836,680 B2 | 11/2010 | Schwarz | |
| 7,937,949 B2 | 5/2011 | Eccles et al. | |
| 8,245,517 B2 | 8/2012 | Sullivan et al. | |
| 9,428,267 B2 | 8/2016 | DeVita et al. | |
| 9,698,722 B2 | 7/2017 | Loken et al. | |
| 9,951,694 B2 | 4/2018 | Thiriet et al. | |
| 10,352,189 B2 | 7/2019 | Lamarre et al. | |
| 11,300,054 B2 | 4/2022 | Des Roches-Dionne et al. | |
| 11,300,056 B2 | 4/2022 | Kempers et al. | |
| 2006/0032234 A1 | 2/2006 | Thompson | |
| 2006/0260323 A1 | 11/2006 | Moulebhar | |
| 2006/0266047 A1 | 11/2006 | Eick et al. | |
| 2007/0018516 A1* | 1/2007 | Pal | F04D 25/082 310/58 |
| 2008/0072568 A1 | 3/2008 | Moniz et al. | |
| 2011/0061396 A1 | 3/2011 | Dooley | |
| 2011/0239657 A1 | 10/2011 | Tate | |
| 2013/0214091 A1 | 8/2013 | Hillel | |
| 2013/0215573 A1* | 8/2013 | Wagner | G06Q 30/0629 361/702 |
| 2014/0090808 A1* | 4/2014 | Bessho | C09K 5/063 165/104.17 |
| 2014/0216088 A1* | 8/2014 | Weber | B64D 37/34 165/41 |
| 2014/0238032 A1 | 8/2014 | Fitzgerald et al. | |
| 2014/0373554 A1 | 12/2014 | Pech et al. | |
| 2015/0101838 A1* | 4/2015 | Shepard | H05K 7/1432 174/50 |
| 2018/0149086 A1* | 5/2018 | Moniz | F01D 25/24 |
| 2018/0171874 A1 | 6/2018 | Klonowski et al. | |
| 2018/0354632 A1* | 12/2018 | Hon | F02C 6/14 |
| 2019/0300182 A1* | 10/2019 | Knapp | B64D 15/06 |
| 2020/0088099 A1* | 3/2020 | Roberge | F02C 7/224 |
| 2020/0123979 A1 | 4/2020 | Kusnierek et al. | |
| 2020/0123980 A1 | 4/2020 | Kusnierek et al. | |
| 2021/0207542 A1* | 7/2021 | Pal | H05K 7/20936 |
| 2022/0063826 A1* | 3/2022 | Hiett | F02C 9/00 |
| 2022/0106059 A1 | 4/2022 | Smith et al. | |
| 2022/0340260 A1 | 10/2022 | Krzywon | |
| 2023/0164957 A1* | 5/2023 | Evans | H05K 7/20836 700/300 |
| 2023/0417148 A1 | 12/2023 | Trivedi et al. | |
| 2024/0003300 A1 | 1/2024 | Wasselin | |

FOREIGN PATENT DOCUMENTS

| | | |
|---|---|---|
| EP | 2339147 A2 | 6/2011 |
| EP | 3640455 A1 | 4/2020 |
| EP | 3845749 A1 | 7/2021 |
| JP | 2006144617 A | 6/2006 |
| JP | 2017512698 A | 5/2017 |
| RU | 2660725 C2 | 7/2018 |
| WO | 2010092267 A1 | 8/2010 |
| WO | 2017015341 A1 | 1/2017 |

OTHER PUBLICATIONS

U.S. Appl. No. 17/819,509, filed Aug. 12, 2022, naming inventors Schenk et al.
U.S. Appl. No. 17/819,527, filed Aug. 12, 2022, naming inventors Schenk et al.
U.S. Appl. No. 18/360,886, filed Jul. 28, 2023, naming inventors Badger et al.
U.S. Appl. No. 18/360,911, filed Jul. 28, 2023, naming inventors Lawrence et al.
U.S. Appl. No. 18/360,922, filed Jul. 28, 2023, naming inventors Coffee et al.
U.S. Appl. No. 18/361,086, filed Jul. 28, 2023, naming inventors Schenk et al.
U.S. Appl. No. 18/361,075, filed Jul. 28, 2023, naming inventors Lawrence et al.
U.S. Appl. No. 18/360,933, filed Jul. 28, 2023, naming inventors Lawrence et al.
U.S. Appl. No. 18/360,959, filed Jul. 28, 2023, naming inventors Schenk et al.
Extended Search Report from counterpart European Application No. 23204459.4 dated Mar. 27, 2024, 6 pp.

* cited by examiner

MOTOR AND MOTOR CONTROLLER THERMAL MANAGEMENT FEATURES

TECHNICAL FIELD

This disclosure relates to starting gas turbine engines.

BACKGROUND

Turbine engines extract energy to perform work by compressing a working fluid, mixing a fuel into the compressed working fluid, igniting the fuel/fluid mixture, and expanding the combusted fuel/fluid mixture through a turbine. When a turbine is operating, a portion of the extracted energy is provided as the work input to the engine's compressor, thereby making the operation of the turbine self-sustaining. Prior to reaching this self-sustaining point, the work input to drive the compressor may be supplied by some system other than the turbine(s). These other systems often incorporate a starter that provides the motive force to turn the engine compressor, thereby providing an airflow to the turbine that can, eventually, extract and provide enough work output to drive the compressor.

SUMMARY

Several different starter types may be used to start gas turbine engines. Some example gas turbine engine starter types include, air-turbine starters, electrical starters, hydraulic starters, and gas-cartridge starters. The gas turbine engine may be started by a controller executing an ignition sequence, where a spark is ignited in a combustor of the gas turbine engine when scheduled combustion conditions are reached (e.g., air flow, engine rotational speed, fuel flow, and the like.) Typically, a particular implementation may use only a single starter type (e.g., just one of an air-turbine starter or an electric starter, but not both). The starter type and ignition sequence may be chosen based on more or more factors including, for example, engine life, mechanical and/or thermal stresses, energy efficiency of the start, energy storage reduction (e.g., battery life reduction), noise restrictions, or the like. However, in some scenarios, an engine start may be desired as quickly and/or as reliably as possible, with less regard toward the potentially deleterious effects to these other considerations. Such scenarios may include emergency in-flight restarts, where at least one gas turbine engine of a plurality of gas turbine engines has been lost and needs to be restarted in the in-flight. Another such scenario, while unlikely, is an emergency in-flight restart where both engines are lost in a twin-engine aircraft, or each engine of a plurality of engines is lost.

In such a situation, and in accordance with one or more aspects of this disclosure, an aircraft may be configured to perform an emergency in-flight restart. During an emergency in-flight restart, a controller may receive, either manually or automatically, an emergency restart command in response to loss of an engine while the aircraft is in-flight. Responsive to receiving the emergency restart command, the controller may determine whether at least a second gas turbine engine of a plurality of gas turbine engines is in operation. Responsive to receiving the emergency restart command and determining that at least the second gas turbine is in operation and that the first gas turbine is not in operation, the controller may cause execution of the emergency in-flight restart by at least simultaneously causing an air turbine starter and an electric machine to cause rotation of a spool of the gas turbine engine. In this way, the gas turbine engine may be restarted as quickly and reliably as possible by using energy from multiple sources, without regard or with only minimal regard to secondary considerations (e.g., energy efficiency, engine life, battery life, etc.). Performance of the emergency in-flight restart may help ensure that the aircraft may be safely landed, at which point the secondary considerations may be addressed.

In some examples, the air turbine starter may receive fluid (e.g., air) from one or more sources external to the gas turbine during an emergency in-flight restart to cause additional rotation of the spool of the gas turbine engine. For example, bleed air from one or more additional gas turbine engines may be routed to the air turbine starter. In aircrafts which include an auxiliary power unit (APU), bleed air from the APU may be routed to the air-turbine starter, alone or in addition to bleed air from a second (operational) main gas turbine engine of a plurality of gas turbine engines. In some examples, a gas-cartridge or compressed air tank may supply further compressed air to the air-turbine starter. Supplying fluid from any one or more than one of these sources to an air turbine starter may cause rotation of the spool to restart the engine. Supplying fluid from a combination of sources may advantageously allow the spool to reach a threshold rotational speed for a start to be executed more quickly.

In combination with multiple starting modes or all alone, other efforts to restart an engine in-flight may be employed. For example, an ignition sequence of the gas turbine engine may be modified for faster and/or easier restarting of the engine in-flight. For example, during a normal start, with an aircraft on the ground, fuel may be introduced to a combustor and combusted in the combustor at a first threshold rotational speed of the first spool, resulting in a first turbine temperature (e.g., turbine entry temperature (TET) or turbine inlet temperature (TIT)) of the gas turbine engine. During an emergency in-flight restart, the ignition sequence may be modified such that fuel is introduced and combusted at a second threshold rotational speed, resulting in a second turbine temperature. The second threshold rotational speed may be lower than the first threshold rotational speed, and the second turbine temperature may accordingly be higher. Although operation at the second turbine temperature may be deleterious to engine life over the long-term, modification of the ignition sequence in this way may result in execution of an emergency in-flight restart, which may help ensure that the aircraft may be safely landed.

In examples which include using an electric machine controlled by a motor controller to cause rotation of a spool of the gas turbine engine, systems and techniques according to the present disclosure may manage thermal energy generated by the electric restart procedure in the starter system (e.g., the motor controller and electric machine (electric starter motor)). Absent such a cooling system, power switches in the motor controller may overheat and fail. The disclosed cooling systems and techniques may be closed-loop and/or lightweight, because the electric machine need only operate until the emergency in-flight restart is complete and operation of the gas turbine engine is self-sustaining. Since the emergency in-flight restart may only take seconds or minutes, a closed-loop cooling system may not include a heat exchanger and/or other equipment typically associated with thermal energy systems. Furthermore, the closed-loop cooling system may be sized to absorb a maximum amount of thermal energy that is substantially equal to the maximum amount of thermal energy that can be generated during the emergency in-flight restart. In this way, the electric machine may cause rotation of the spool during all or a portion of the emergency restart procedure without the motor controller overheating and while only adding minimal weight to the aircraft.

In some examples, the disclosure is directed to a starting apparatus for a first gas turbine engine of a plurality of gas turbine engines of an aircraft. The apparatus includes an air turbine starter configured to cause rotation of a spool of the first gas turbine engine of the plurality of gas turbine engines using compressed air derived from a source external to the gas turbine engine. The apparatus further includes an electric machine configured to cause rotation of the spool of the first gas turbine engine. The apparatus includes a controller configured to: receive an emergency restart command for the first gas turbine engine while the aircraft is in-flight; determine whether the first gas turbine engine is in operation; determine whether at least a second gas turbine engine of the plurality of gas turbine engines is in operation; and responsive to receiving the emergency restart command and determining that at least the second gas turbine engine of the plurality of gas turbine engines is in operation and that the first gas turbine engine is not in operation, perform an emergency restart of the first gas turbine by at least simultaneously causing the air turbine starter and the electric machine to cause rotation of the spool of the first gas turbine engine.

In some examples, the disclosure is directed to a method of starting a first gas turbine engine of a plurality of gas turbine engines in-flight. The method includes receiving, via a controller, an emergency restart command for the first gas turbine engine of the plurality of gas turbine engines while the aircraft is in-flight. The method includes determining, via the controller, whether the first gas turbine engine is in operation and, responsive to determining that the first gas turbine engine is not in operation, determining whether at least a second gas turbine engine of the plurality of gas turbine engines is in operation. The method includes, responsive to receiving the emergency restart command and determining that at least the second gas turbine engine of the plurality of gas turbine engines is in operation and that the first gas turbine engine is not in operation, performing an emergency restart of the first gas turbine by at least simultaneously causing an air turbine starter and an electric machine to cause rotation of a spool of the first gas turbine engine.

In some examples, the disclosure is directed to a starting apparatus for a gas turbine engine of a plurality of gas turbine engines of an aircraft. The apparatus includes a fuel supply system, a combustor, and a controller. The controller is configured to cause fuel to be introduced to the combustor of the gas turbine engine at a first threshold rotational speed of the gas-turbine engine during a normal starting operation in which the aircraft is on the ground. The controller is configured to cause fuel to be introduced to the combustor at a second threshold rotational speed of the gas-turbine engine during an emergency in-flight restarting operation in which the aircraft is in-flight. The second threshold rotational speed is lower than the first threshold rotational speed. Introducing fuel at the second threshold rotational speed results in a higher temperature in a turbine of the gas turbine engine than introducing fuel at the first threshold rotational speed.

In some examples, the disclosure is directed to a starting method for a gas turbine engine of a plurality of gas turbine engines of an aircraft. The method includes causing, via control by a controller, fuel to be introduced from a fuel supply to a combustor of the gas turbine engine at a first threshold rotational speed during a normal starting operation in which the aircraft is on the ground. The method includes causing, via control by the controller, fuel to be introduced from the fuel supply to the combustor at a second threshold rotational speed during an emergency restarting operation in which the aircraft is in-flight. The second threshold rotational speed is lower than the first threshold rotational speed. Introducing fuel at the second threshold rotational speed results in a higher temperature in a turbine of the gas turbine engine.

In some examples, the disclosure is directed to a system which includes a gas turbine engine configured to provide propulsion to an aircraft. The system further includes a starter system configured to start the gas turbine engine. The starter system includes a motor controller and a closed-loop cooling system configured to cool the motor controller during an emergency in-flight restart operation of the gas turbine engine. The closed-loop cooling system includes a cooling fluid reservoir containing cooling fluid, wherein the cooling fluid is configured to receive thermal energy from the motor controller during the emergency in-flight restart operation of the gas turbine engine.

In some examples, the disclosure is directed to a method which includes starting a gas turbine engine configured to provide propulsion to an aircraft while the aircraft is in-flight by controlling a motor controller. The method further includes cooling the motor controller with a closed-loop cooling system during an emergency in-flight restart operation of the gas turbine engine. The closed-loop cooling system includes a cooling fluid reservoir containing cooling fluid. The cooling fluid is configured to receive thermal energy from the motor controller during the emergency in-flight restart operation of the gas turbine engine.

The details of one or more examples are set forth in the accompanying drawings and the description below. Other features, objects, and advantages will be apparent from the description and drawings, and from the claims.

DETAILED DESCRIPTION

Figure 1:
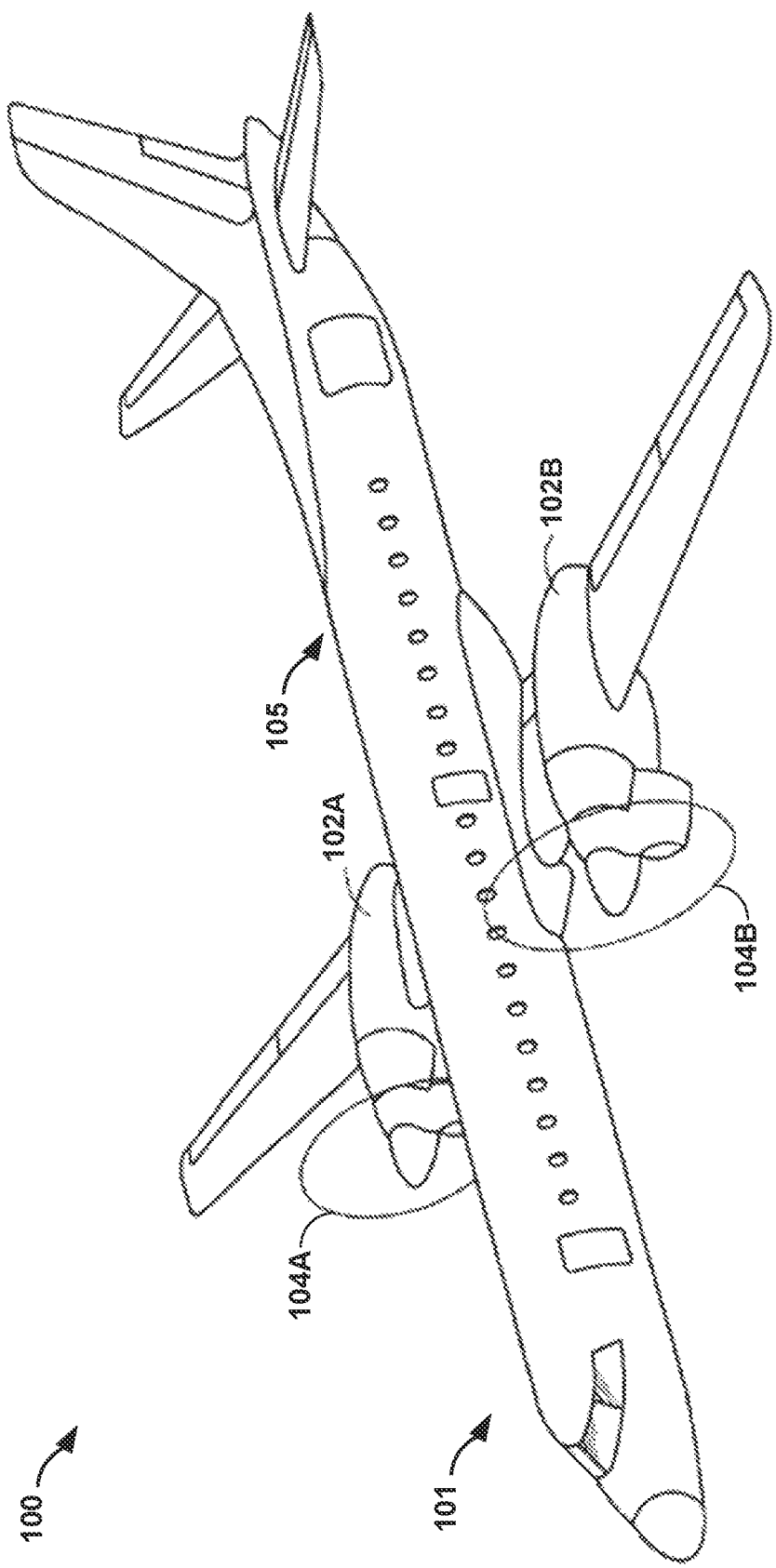
FIG. 1 is a conceptual diagram illustrating an aircraft having multiple types of starters for gas turbine engines, in accordance with one or more aspects of this disclosure.

FIG. 1 is a conceptual diagram illustrating an aircraft having multiple types of starters for gas turbine engines, in accordance with one or more aspects of this disclosure. As shown in FIG. 1, system 100 may include aircraft 101 and one or more gas turbine engines 102A and 102B (collectively, "gas turbine engines 102") that drive one or more propulsors 104A and 104B (collectively, "propulsors 104"). Aircraft 101 may be any type of aircraft including fixed wing, vertical takeoff and landing (VTOL), short takeoff and landing (STOL), rotorcraft, airplanes, and the like.

Gas turbine engines 102 and propulsors 104 may collectively be configured to propel aircraft 101. While illustrated in FIG. 1 in a turbo-prop configuration in which propulsors 104 are propellers, gas turbine engines 102 and propulsors 104 are not so limited. For instance, in other examples propulsors 104 may be fans such that gas turbine engines 102 and propulsors 104 may be in a turbo-fan configuration (e.g., low or high bypass). Furthermore, while illustrated in FIG. 1 as being wing-mounted, gas turbine engines 102 are not so limited. For instance, in other examples, gas turbine engines 102 and propulsors 104 may be fuselage mounted (e.g., mounted to a fuselage of aircraft 101 via pylons). In such examples, a twin-engine aircraft 101 may include first gas turbine engine 102A disposed on a first side of fuselage 105 and second gas turbine engine 102B mounted on a second opposite side.

Aircraft 101 may include multiple starter types for each of gas turbine engines 102. As one example, aircraft 101 may include both an air-turbine starter and an electric starter for each of gas turbine engines 102. For instance, aircraft 101 may include a first air-turbine starter and a first electric starter for gas turbine engine 102A and a second air-turbine starter and a second electric starter for gas turbine engine 102B. Gas turbine engines 102A and 102B may be functionally substantially equivalent and/or interchangeable, such that description of first gas turbine engine 102A may also apply to gas turbine engine 102B. Aircraft 101 may include additional or different starter types. For instance, aircraft 101 may include two or more of air-turbine starters, electrical starters, hydraulic starters, and gas-cartridge starters. Each starter type may be configured to cause rotation of a spool of the gas turbine engine, such that gas turbine engines 102 may be rotated by one or more starters until enough work can be extracted such that the engine becomes self-sustaining.

Including multiple starter types may present various advantages. As one example, including starters that utilize different energy sources may provide improved reliability in the event an energy source is not available. For instance, an aircraft 101 that includes air-turbine starters that use compressed air and electric starters that use electrical energy may enable starting when either electrical energy or compressed air is available, but may not require both electrical energy and compressed air to be available. In some examples, when both compressed air and electrical energy are available, both types of starters may be employed to execute an emergency in-flight restart, which may be performed when one or both of gas turbine engines 102 are lost (e.g., become non-operational) in the air. Using both types of starters to execute an emergency in-flight restart may increase the speed and/or reliability of the in-flight restart.

An air-turbine starter may need a source of compressed air to operate. In example aircrafts which include a plurality of gas turbine engines, bleed air from second gas turbine engine 102B may supply compressed air to first gas turbine engine 102A. In example aircrafts which include an auxiliary power unit (APU) (not illustrated in FIG. 1) (e.g., a non-propulsion gas turbine engine), bleed air from the APU may provide compressed air to an air turbine starter. In the unlikely event of engine loss of gas turbine engine 102A, gas turbine engine 102B, or both (e.g., complete engine loss) while aircraft 101 is in flight, it may be desirable to start the lost gas turbine engine or gas turbine engines as reliably, quickly, and or safely as possible so that the engine can be restarted in-flight. For purposes of this disclosure, any in-air start of gas turbine engine 102A and/or gas turbine 102B may be called an emergency in-flight restart.

In accordance with one or more aspects of this disclosure, aircraft 101 may be configured to simultaneously cause rotation of a spool of gas turbine engine 102A during an emergency in-flight restart with energy from multiple starter types. In this way, the probability that a successful start is achieved may be increased, and the speed with which a successful start is achieved may also be increased. The multiple types of starters may include and electric starter and an air-turbine starter. In some examples, compressed air may be supplied to the air-turbine starter from a source external to gas turbine engine 102A, such as from second gas turbine 102B. Additionally, or in situations where both engines 102A and 102B must be restarted in-flight, compressed air may be supplied to the air-turbine starter from an APU, or from a compressed air tank. In some examples, compressed air may be supplied from more than one or the above sources, such as a first source and a second source, such that additional rotation (e.g., torque) may be generated by the air-turbine starter, which may start gas turbine engine 102A more reliably and/or more quickly. In some examples, both the electric starter and air turbine starter may be configured to cause rotation of HP spool 220A throughout the start (i.e., until gas turbine engine 102A is self-sustaining). Causing rotation of the spool may, in some examples, help avoid a hung start, which is a condition where gas turbine engine 102A lights properly but does not accelerate toward idling speed, but rather the rotational speed of the spool plateaus or drops off after fuel is injected and combustion begins.

In accordance with one or more aspects of the disclosure, instead of or in addition to simultaneously causing rotation of a spool of gas turbine engine 102A with both an electric starter and an air-turbine starter, the ignition sequence of a start procedure may be modified to more reliably and/or more quickly start gas turbine engine 102A. Engine 102A may include a fuel supply configured to feed a combustor, where the fuel is combusted with compressed air. Gas turbine engine 102A may include a controller that is configured to cause fuel to be introduced and combusted when the spool reaches a first threshold rotational speed when aircraft 101 is on the ground and is performing a normal starting procedure. During and emergency in-flight restart, the controller may be configured to introduce fuel to the combustor at a second threshold rotational speed. The second threshold rotational speed may be lower than the first threshold rotational speed, such that fuel is introduced earlier during an emergency in-flight restart than it is during a normal ground start. Introduction of fuel at the second threshold rotational speed may result in a higher temperature in the combustor (which may be measured at the turbine and called the turbine entry temperature (TET) or turbine inlet temperature (TIT)) than introduction of fuel at the first threshold rotational speed. Put differently, introducing fuel earlier in the spool-up process may cause gas turbine engine 102A to run hotter. Ordinarily, running the engine hotter may not be desirable because the turbine temperature may approach or exceed a critical temperature, where component life is adversely impacted and/or maintenance procedures may be required up landing to inspect components for signs of overheat damage. However, the interest of reliably and/or quickly restarting engine 102A during the emergency in-flight restart may outweigh these long-term costs, and the fuel schedule may be modified to make the restart faster and/or easier, so that aircraft 101 may be safely landed with operating gas turbine engines 102.

As mentioned above, and in accordance with one or more aspects of this disclosure, the electric starter may impart torque throughout the emergency in-flight restart operation, until available power is expended or gas turbine engine 102A becomes self-sustaining. The emergency in-flight restart may take several tries and/or extend over a period of time from seconds to minutes. For example, the emergency in-flight restart may take from about one minute to about 15 minutes, or from about two minutes to about 10 minutes, or from about three minutes to about seven minutes. Accordingly, a starter system including an electric starter and associated motor controller(s) may generate thermal energy throughout the duration of the emergency in-flight restart. In some examples, the motor controller may have power switches which generate a power signal to control an electric starter motor which causes rotation of a spool of the gas turbine engine. These power switches may generate thermal energy and be prone to overheat during the emergency in-flight restart, where the electric motor is running continuously for the duration of the process. Systems and techniques according to the present disclosure may include a closed-loop cooling system configured to cool the motor controller during the emergency in-flight restart. In some examples, the closed-loop cooling system may include a cooling fluid reservoir and cooling fluid, but not a heat exchanger. Furthermore, the closed-loop cooling system may be sized to only cool for the duration of the emergency in-flight restart. In other words, in some examples, the closed loop cooling system may include enough cooling fluid to absorb a maximum amount of thermal energy, and the maximum amount of thermal energy may be substantially equal to the maximum amount of thermal energy that can be generated by the motor controller and/or electric starters during the emergency in-flight restart. In this way, the closed-loop cooling system may receive thermal energy from the motor controller during the emergency in-flight restart to keep the power switches from overheating, but not unnecessarily weigh down aircraft 101 with over-sized and/or unnecessary equipment.

Figure 2:
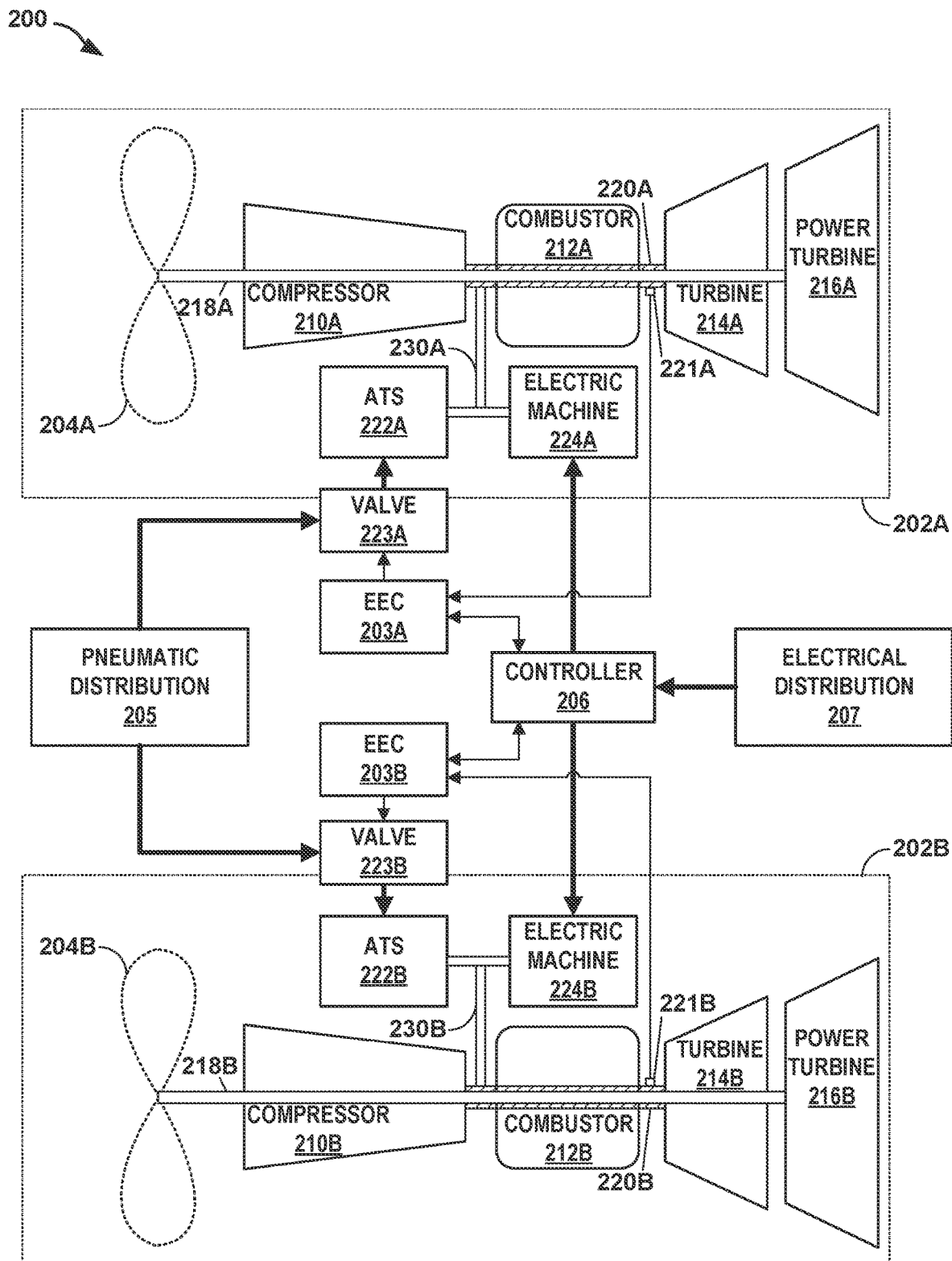
FIG. 2 is a conceptual diagram illustrating further details of example gas turbine engines and associated systems, in accordance with one or more aspects of this disclosure.

FIG. 2 is a conceptual diagram illustrating further details of example gas turbine engines and associated starters, in accordance with one or more aspects of this disclosure. System 200 of FIG. 2 may be an example of system 100 of FIG. 1. As shown in FIG. 2, system 200 may include gas turbine engines 202A and 202B (collectively, "gas turbine engines 202") and propulsors 204A and 204B (collectively, "propulsors 204"), pneumatic distribution 205, engine controllers 203A and 203B (collectively, "engine controllers 203"), valves 223A and 223B (collectively, "valves 223"), controller 206, and electrical distribution 207. Gas turbine engines 202 and propulsors 204 may be examples of gas turbine engines 102 and propulsors 104. In some examples, propulsors 204 may be propellers, as illustrated in FIG. 2.

Gas turbine engines 202 may each include a compressors of compressors 210A/210B (collectively, "compressors 210"), a combustor of combustors 212A/212B (collectively, "combustors 212"), a turbine of turbines 214A/214B (collectively, "turbines 214"), a power turbine of power turbines 216A/216B (collectively, "power turbines 216"), a low-pressure (LP) spool of LP spools 218A/218B (collectively, "LP spools 218"), a high-pressure spool of HP spools 220A/220B (collectively, "HP spools 220"), a spool speed sensor of spool speed sensors 221A/221B (collectively, "spool speed sensors 221"), an air-turbine starter of air-turbine starters 222A/222B (collectively, "air-turbine starters 222"), an electric starter of electric starters 224A/224B (collectively, "electric starters 224"), and starter connection components of starter connection components 230A/230B (collectively, "starter connection components 230").

In operation, compressors 210 may compress air, combustors 212 may add fuel to the compressed air and combust the resulting mixture, exhaust from the combustion may rotate turbines 214 and power turbines 216. Turbines 214 and compressors 210 may be coupled to HP spools 220 (e.g., HP shafts). As such, rotation of turbines 214 result in rotation of compressors 210. Power turbines 216 and propulsors 204 may be connected to LP spools 218 (e.g., LP shafts). As such, rotation of power turbines 216 may result in rotation of propulsors 204. While described and illustrated as a free-power turbine (i.e., where propulsors 104 are propellers driven by power turbines 216, and no compressor is attached to LP spools 218, or a boost compressor attached to LP spools 218), power turbines 216 are not so limited. For instance, in some examples, gas turbine engines 202 may include LP compressors coupled to LP spools 218. Similarly, in some examples, gas turbine engines 202 may be three-spool engines.

Spool speed sensors 221 may each be configured to measure a rotational speed of one or more spools (e.g., HP spools, LP spools, intermediate spools, etc.). For instance, spool speed sensor 221A may be configured to measure a rotational speed of HP spool 220A and spool speed sensor 221B may be configured to measure a rotational speed of HP spool 220B. Spool speed sensors 221 may be configured to output a representation of the measured rotational speeds to one or more other components of system 200, such as EECs 203. For instance, spool speed sensor 221A may output a representation (e.g., digital or analog) of the rotational speed of HP spool 220A to EEC 203A and spool speed sensor 221B may output a representation of the rotational speed of HP spool 220B to EEC 203B. In some examples, spool speed sensors 221 may each contain a temperature probe configured to sense a turbine temperature (TET and/or TIT), and likewise output a representation of the measured temperature to EEC 203A. In such examples, spool speed sensors 221 may be combination speed/temperature sensors. In other examples, temperature may be measured by a discrete temperature sensor located elsewhere in gas turbine engine 202A.

Air-turbine starters (ATSs) 222 may be configured to rotate spools of gas turbine engines 202 to start gas turbine engines 202. ATSs 222 may each include a turbine which may generate rotational force when compressed air is expanded across the turbine. Starter connection components 230 carry the resulting rotational force to the appropriate starting spool. For instance, starter connection components 230A may include gears/shafts/etc. configured to carry rotational force from ATS 222A to HP spool 220A such that rotation of the turbine of ATS 222A results in rotation of HP spool 220A.

Electric starters 224 may be configured to rotate spools of gas turbine engines 202 to start gas turbine engines 202. Electric starters 224 may each include an electric machine which may generate rotational force using electrical energy. Examples of electric machines that may be included in electric starters 224 include, but are not limited to, alternators, dynamos, permanent magnet machines, field wound machines, synchronous, asynchronous, brushed, brushless, etc. Starter connection components 230 carry the resulting rotational force to the appropriate starting spool. For instance, starter connection components 230A may include gears/shafts/etc. configured to carry rotational force from electric starter 224A to HP spool 220A such that rotation of the electric machine of electric starter 224A results in rotation of HP spool 220A.

As noted above, starter connection components 230 may include components configured to convey rotational force generated by starters (e.g., ATSs 222 and/or electric starters 224) to starting spools (e.g., HP spools 220) of gas turbine engines 202. As illustrated in the example of FIG. 2, starter connection components 230 may include a tower shaft connected to a gearbox that joins the starters. However, it is understood that other arrangements of starter connection components 230 are contemplated. In some examples, both ATSs 222 and electric starters 224 may be mechanically coupled to the same start gear, which is not specifically illustrated within starter connection components 230. The start gear may be a dual-ended gear comprising a first end and a second opposite end, and both ATSs 222 and electrical starters 224 may be connected to the first end. In this way, mechanical complexity may be reduced while allowing for multiple starting modes to cause rotation of HP spool 220A.

In some examples, starter connection components 230 may include one more clutches configured to rotationally de-couple the starters from the starting spools. For instance, starter connection components 230A may include a clutch configured to rotationally decouple electric starter 224A from HP spool 220A. Inclusion of such a clutch may be desirable in that electric starter 224A may be rotationally de-coupled from gas turbine engine 202A. For instance, in the event of a fault in the electric machine of electric starter 224A, the clutch may be actuated to rotationally de-couple electric starter 224A from HP spool 220A such that a rotor of the electric machine ceases to be driven, thereby mitigating the fault. However, inclusion of such a clutch may present one or more disadvantages. For instance, inclusion of the clutch may add additional weight (e.g., 10, 15, 20 lbs.) per engine of gas turbine engines 202. As noted above, additional weight in the aerospace context is undesirable.

Pneumatic distribution 205 may include various sources of compressed air and components configured to transport the compressed air about the aircraft. Example sources of compressed air include, but are not limited to, bleed air from an operating engine of gas turbine engine 202, bleed air from the APU, compressed air storage tanks, and ground sources (e.g., huffer-cart). Pneumatic distribution 205 may provide the compressed air to various components of system 200. For instance, pneumatic distribution 205 may provide compressed air to ATSs 222 (e.g., as controlled by valves 223).

Valves 223 may control the flow of compressed air to ATSs 222. For instance, valve 223A may selectively allow compressed air to flow from pneumatic distribution 205 to ATS 222A and valve 223B may selectively allow compressed air to flow from pneumatic distribution 205 to ATS 222B. Valves 223 may control the flow of compressed air based on control signals received from other components of system 200, such as EECs 203. For instance, responsive to a signal received from EEC 203A, valve 223A may allow compressed air to flow from pneumatic distribution 205 to ATS 222A.

Electrical distribution 207 may include various sources of electrical power and components to transport the electrical power about the aircraft. Example sources of electrical power include, but are not limited to, an APU (e.g., a generator of the APU), generators of gas turbine engines 202, ground sources (e.g., ground grid connection or ground power cart), batteries, or other on-board electrical systems. Electrical distribution 207 may provide the electrical power to various components of system 200. For instance, electrical distribution 207 may provide electrical energy to controller 206.

Controller 206 may be configured to control operation of various components of system 200, such as electric starters 224. In some examples, controller 206 may be referred to as a common controller or a common electric motor controller in that it may control electric starters of a plurality of gas turbine engines 202. For instance, controller 206 may control both electric starter 224A and electric starter 224B. As discussed in further detail below, controller 206 may include one or more power switches configured to generate power signals to drive electric starters 224 and/or one or more multiplexors.

Engine controllers 203 may be configured to control various functions of gas turbine engines 202. Engine controllers 203 of any of the above aspects may be implemented as a single controller or multiple separate (e.g., distributed) controllers. Engine controllers 203 may include one or more discrete controllers for each of gas turbine engines 202. For instance, as shown in FIG. 2, EEC 203A may control functions of gas turbine engine 202A and EEC 203B may control functions of gas turbine engine 202B. Thus, engine controllers 203 may be or may form part of a control system. Engine controllers 203 may be implemented in software, hardware or a combination of the two. Engine controllers 203 may be or may be a functional module of an Engine Electronic Controller (EEC) or a Full Authority Digital Engine Controller (FADEC). Although various functions are attributed herein to controller 206 and other functions are attributed herein to EECs 203, it is understood that this is merely for ease of description, and controller 206 and EECs 203 may have different functionality, or may be integrated into a single unit which performs all of the described functions.

In a normal ground starting operation, engine controllers 203 may perform one or more operations to start gas turbine engines 202. For instance, EEC 203A may cause valve 223A to open, thereby allowing compressed air to flow from pneumatic distribution 205 to ATS 222A. The compressed air may expand across ATS 222A, causing rotation of the turbine of ATS 222A and thereby causing rotation of HP spool 220A. EEC 203A may monitor a rotational speed of HP spool 220A (e.g., via spool speed sensor 221A). Once the rotational speed of HP spool 220A reaches a threshold rotational speed for combustion, EEC 203A may cause fuel to be introduced into combustor 212A and cause firing of ignitors within combustor 212A. Once the rotational speed of HP spool 220A reaches a self-sustaining threshold rotational speed, gas turbine engine 202A may be self-sustaining and EEC 203A may cause valve 223A to close. EEC 203B may perform similar techniques to start gas turbine engine 202B.

During an emergency in-flight restart (e.g., a mid-air restart), controller 206 may receive an emergency restart command for gas turbine engine 202A from EEC 203A. For example, the emergency restart command may be automatically generated when the rotational speed of HP spool 220A or another spool of engine 202A falls below a threshold level (e.g., 10% of idle speed, 20% of idle speed, 50% of idle speed, or the like), as sensed by spool speed sensor 221A. Alternatively, controller 206 may receive the emergency restart command from the pilot manually. Responsive to receiving the emergency restart command, controller 206 may be configured to determine whether gas turbine 202A is operational, based on the turbine temperature and/or rotational speed at speed sensor 221A, or by another method such as the power level generated by power turbine 216A. Responsive to determining that gas turbine engine 202A is not in operation, controller 206 may determine whether at least second gas turbine engine 202B or APU (202C, FIG. 3) is in operation. Responsive to determining that gas turbine engine 202B, APU (202C, FIG. 3), or both is in operation, controller 206 may be configured to perform the emergency in-flight restart by at least simultaneously causing ATS 222A and electric starter 224A to cause rotation of HP spool 220A of gas turbine engine 202A.

Both ATS 222A and electric starter 224 may be utilized to restart gas turbine engines 202A when gas turbine engine 202A is not in operation. For instance, EEC 203A may output a signal to controller 206 that causes controller 206 to utilize electrical energy from electrical distribution 207 to generate and output power signals to electric starter 224A. The power signals may cause a magnetic field in electric starter 224A that causes a rotor of electric starter 224A to rotate. As noted above, rotational energy of the rotor may be carried to HP spool 220A via starter connection components 230. Compressed air may be supplied to ATS 222A to assist the restart. For example, EEC 203A may cause valve 223A to open, thereby allowing compressed air to flow from pneumatic distribution 205 to ATS 222A. The resulting rotation of HP spool 220A, due to electric starter 224A alone or in combination with rotational force imparted by ATS 222A, may cause a rotational speed of HP spool 220A to reach a level at which fuel can be re-introduced into combustor 212A, thereby enabling a restart (e.g., re-light) of gas turbine engine 202A.

In examples where gas turbine engine 202B has been lost, EEC 203B may perform similar techniques to start gas turbine engine 202B. In examples where both gas turbine engine 202A and gas turbine engine 202B have been lost, controller 206 may be configured to perform an emergency in-flight restart of engines 202 in series, or perform an emergency in-flight restart of engines 202 in parallel. In some examples, engine controllers 203 and/or controller 206 may automatically determine whether a series or parallel restart should occur based on the compressed air available from pneumatic distribution 205. For example, if the compressed air available is below a threshold, such as in some versions of aircraft 101 when compressed air from only APU (202C, FIG. 3) is available, controller 206 may determine that a series restart should occur. In a series restart, all of the available compressed air from pneumatic distribution 205 may be directed to ATS 222A by EEC 203A causing valve 223A to open and EEC 203B causing valve 223B to close or remain closed. In some examples, should the re-light of gas turbine engine 202A be successful, EEC 203B may then utilize ATS 222B and controller 206 may cause electric starter 224B to restart gas turbine engine 202B. In some examples, gas turbines engines 202A and 202B may be started simultaneously (i.e., in parallel) by motor controllers 203 opening valves 223 and controller 206 causing electric starters 224 to cause rotation of HP spools 220, such that compressed air from pneumatic distribution 205 flows to all ATSs 222 simultaneously (e.g., at the same time or substantially the same time), and/or electrical energy from electrical distribution 207 flows to all electric starters 224 simultaneously.

With respect to examples where both gas turbine engines 202 are lost and controller 206 determines that gas turbine engines 202 should be restarted in series, while gas turbine engine 202A is described as being restarted first, it should be understood that, in some examples, gas turbine engine 202B may be restarted first. In other examples, only one of gas turbine engines 202 may be restarted (e.g., in the event that damage to one of gas turbine engines 202 is known).

In some examples, EECs 203 may automatically determine which starters to use to start or restart gas turbine engines 202. As one example, responsive to determining that at least a second gas turbine (e.g., propulsive, or non-propulsive) is in operation one compressed air source of pneumatic distribution 205 is available, engine controllers 203 may automatically determine to utilize at least ATS 222 to start gas turbine engines 202. In some examples, engine controllers 203 may receive external signals (e.g., from pilots of aircraft 101) indicating which starts to use to start or restart gas turbine engines 202.

As noted above, gas turbine engines 202 may be configured such that shafts that drive propulsors 204 (i.e., LP spools 218) may not be connected to any compressors. As such, a windmilling emergency in-flight restart may not be possible as rotation of propulsors 204 may not result in much additional airflow through cores of gas turbine engines 202 (e.g., through combustors 212 and turbines 214). As such, aspects of this disclosure related to emergency in-flight restarts using electric starters 224 and ATSs 222 may be particular useful in such arrangements. However, in some examples windmilling (e.g., allowing propulsors 204 to rotate freely) during an emergency in-flight restart may be helpful as another source of compressed air, however small, routed through the core. In some examples, especially where LP spools 218 are configured to drive propulsors 204, system 200 may be configured such that a windmilling operation of propulsor 204A drives a generator (not illustrated in FIG. 2) that generates electrical power from the windmilling operation. The generated electrical power may be supplied to electric motors 224 for performing the emergency in-flight restart of gas turbine engines 202. Using a windmilling operation to generate electrical power rather than airflow through the core may be more efficient, in some examples, and thus more helpful during the emergency in-flight restart. Furthermore, generating electrical energy from a windmilling operation may allow for reduced battery size (in examples where battery power is used by electrical distribution 207 to start electric motors 224). In this way, gas turbine engine 202A may generate at least a portion of the electrical energy used by electric starter 224A to perform the emergency in-flight restart of gas turbine engine 202A by EEC 203A allowing propulsor 204A to windmill as aircraft (101, FIG. 1) moves through the air. As such, techniques of this disclosure may enable windmill re-start of a turbo-prop engine with a free power turbine. In some examples, such as in the case of a dual-engine flameout, mechanical and/or electrical energy generated by windmilling operation of both first gas turbine engine 202A and second gas turbine engine 202B may be simultaneously directed to first gas turbine engine 202A either mechanically or electrically, as described above. In this way, another source of energy may contribute to reliably and/or quickly restarting first gas turbine 202A.

In some examples, where propulsors 204 are variable pitch propulsors, EECs 203 may be configured to manipulate the pitch of blades of propulsors 204 to increase the reliability and/or speed of the emergency in-flight restart. For example, EECs 203 may command feathering (i.e., rotating blades until they are edgewise to the flight direction, reducing drag) and/or unfeathering (rotating blades to be more perpendicular to the flight direction, increasing drag) of propulsors 204. In some examples, during an emergency in-flight restart where propulsors 204 are windmilling, EECs 203 may command an unfeathering of the propulsor. In some examples, such an action may increase the amount of electrical energy generated by the windmilling operation, which may be supplied to electric starter 224 by electrical distribution 207.

As mentioned above, and in accordance with one or more aspects of this disclosure, ATS 222A and/or electric starter 224A may be configured to cause rotation of HP spool 220A throughout the emergency in-flight restart. For example, electric starter 224A may impart torque throughout the emergency in-flight restart process, until available power is expended or gas turbine engine 102A becomes self-sustaining. The emergency in-flight restart may take several tries and/or extend over a period of time from seconds to minutes. For example, the emergency in-flight restart occur during a time period with duration of from about one minute to about 15 minutes, or from about two minutes to about 10 minutes, or from about three minutes to about seven minutes.

Figure 3:
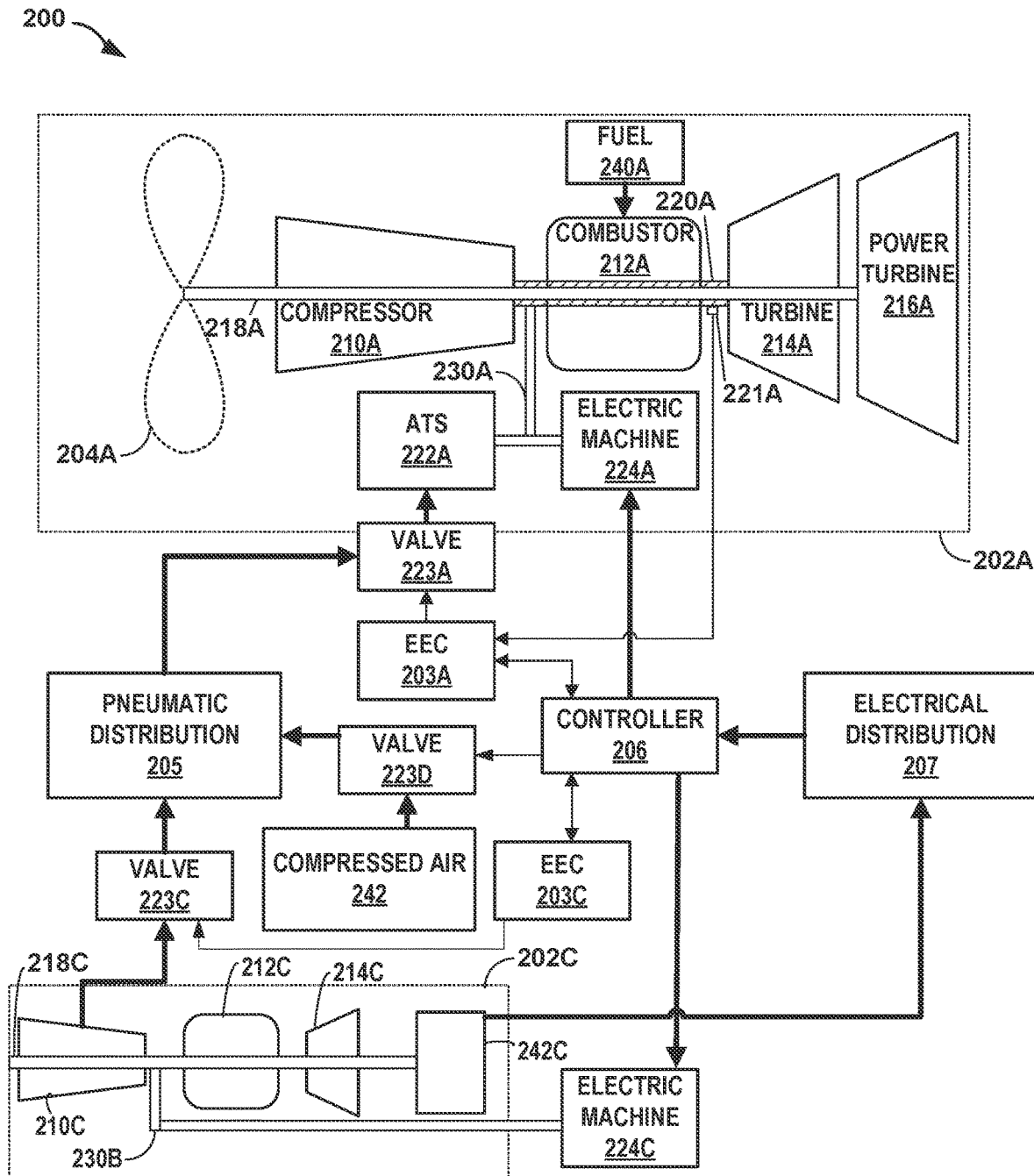
FIG. 3 is a conceptual diagram illustrating further details of other portions of the example aircraft of FIG. 2, in accordance with one or more aspects of this disclosure.

FIG. 3 is a conceptual diagram illustrating further details of other portions of system 200 of FIG. 2, in accordance with one or more aspects of this disclosure. FIG. 3 omits second gas turbine engine 202B for clarity, and illustrates APU 202C and compressed air tank 242 instead, although all of first gas turbine engine 202A, second gas turbine engine 202B, and APU 202C are components of system 200. APU 202C may be a non-propulsive gas turbine engine, and generally may be smaller than main gas turbine engines 202A and 202B. APU 202C may include electric starter 224C, compressor 210C, combustor 212C, and turbine 214C, which may be all disposed on shaft 218C and configured to operate similarly to corresponding portions of main gas turbine engine 202 through control by EEC 203C. However, rather than generating propulsion, in operation APU 202C may be configured to generate electrical power by generator 242C. The generated electrical power may be supplied to electrical distribution 207 for distribution. In some examples, APU 202C may be located in a tail-section of a fuselage of aircraft 101 (FIG. 1). In some examples, compressor 210C of APU 202C may be configured to compress air, and a bleed air line which includes valve 223C. Valve 223C may be opened to route bleed air from APU 202C to pneumatic distribution 205.

System 200 may also include one or more compressed air tanks 242, which may be tanks, gas cartridges, or other units configured to store compressed fluid (e.g., air) for routing to ATSs 222 during an emergency in-flight restart. For example, controller 206 may be configured to cause valve 223D to open to route compressed air from compressed air tank 242 to pneumatic distribution 205, where the compressed air may be routed to ATS 222A to cause additional rotation of HP shaft 220A during an emergency in-flight restart.

In examples where EEC 203A determines that gas turbine engine 202A is not in operation and further determines that gas turbine engine 202A should undergo an emergency in-flight restart operation, compressed air may be delivered to ATS 222A by pneumatic distribution 205 as described above to cause rotation of gas turbine engine 202A during the emergency in-flight restart. In some examples, as described and illustrated with respect to FIG. 2, the compressed air may be sourced from second gas turbine engine 202B, if gas turbine engine 202B is in operation. In addition to gas turbine engine 202B, in some examples compressed air delivered to ATS 222A may include a second source and/or a third source, which may increase the reliability of the emergency in-flight restart operation by increasing from a first source to two sources, and further from two sources to three sources, and/or reduce the time for restart by increasing the force generated by ATS 222A by expanding more compressed air across ATS 222A as the number of compressed air sources increases. Any of bleed air from second gas turbine engine 202B, bleed air from APU 202C, or compressed air from compressed air tank 242 may be configured as the first source, second source, and or third source of compressed air for pneumatic distribution 205.

Also illustrated in FIG. 3 is fuel supply system 240A, which is configured to store and supply fuel to combustor 212A of gas turbine engine 202A for mixing with compressed air from compressor 210A and combustion. As such, fuel supply may include one or more tanks, valves, pumps, and associated piping. As mentioned above, EEC 203A may monitor a rotational speed of HP spool 220A (e.g., via spool speed sensor 221A). Once the rotational speed of HP spool 220A reaches a threshold rotational speed for combustion, EEC 203A may cause fuel to be introduced into combustor 212A and cause firing of ignitors within combustor 212A.

In some examples, the relationship between the speed of HP spool 220A, the introduction of fuel from fuel supply 240A, the spark for combustion, and other operations of gas turbine engine 202A may be scheduled as the ignition sequence and stored within processing circuitry of EEC 203A. During a normal starting operation in which aircraft (101, FIG. 1) is on the ground, the ignition sequence may include EEC 203A causing fuel to be introduced when HP spool 220A reaches a first threshold rotational speed, which may be scheduled as the normal starting procedure. In accordance with one or more aspects of this disclosure, the ignition sequence may be modified during an emergency in-flight restart of gas turbine engine 202A to improve reliability and/or speed of the starting operation. For example, during an emergency in-flight restart, EEC 203A may cause fuel from fuel supply 240A to be introduced when HP spool 220A reaches a second threshold rotational speed. In some examples, the second threshold rotational speed may be lower than the first threshold rotational speed. Put differently, fuel may be introduced earlier in the spool-up process of gas turbine engine 202A during an emergency in-flight restart procedure than during a normal ground start, which may increase reliability of the start relative to a normal ground start and/or may, in some examples, bring gas turbine engine 202A up to an operational rotational speed faster than a normal ground start.

However, components of gas turbine engine 202A may be susceptible to overheating failures if they are allowed to get too hot. Example deleterious effects of overheating gas turbine engine 202A include cracking or failure of high-temperature coatings on hot section components. Gas turbine engine 202A may overheat if fuel is injected and combusted in combustor 212A with insufficient compressed air from compressor 210A. A critical turbine temperature may be a turbine temperature above which components of gas turbine engine 202A are prone to overheating and the associated problems. In some examples, the critical turbine temperature may be from about 1400 degrees Celsius to about 2,000 degrees Celsius, although other critical temperatures are considered. If the turbine approaches or reaches the critical temperature, EEC 203A may flag and register the temperature excursion. For instance, EEC 203A may generate a data record indicating the occurrence of the temperature excursion. In some examples, approaching or exceeding the critical temperature may mean that aircraft 101 must be inspected for overheat damage upon landing. For instance, based on the data record, maintenance personal may perform an inspection of turbine 214A. In some examples, EEC 203A may additionally create a data record indicating the duration of the temperature excursion. Maintenance, inspection, or the expected lifetime schedule of one or more components may be adjusted based at least partially on the duration of time that the temperature excursion lasted.

The first threshold rotational speed, at which fuel is introduced to combustor 212A when aircraft 101 is on the ground, may be selected at least in part to protect gas turbine engine 202A from the deleterious effects of overheating. For example, since a faster rotational speed of HP spool 220A may result in more compressed air moving through combustor 212A, a first threshold rotational speed may result in a first turbine temperature measured at turbine 214A. The first threshold rotational speed may be chosen such that the resulting first turbine temperature is below (e.g., with a safety margin) the critical turbine temperature.

As discussed above, fuel may be introduced during an emergency in-flight restart at a second threshold rotational speed of HP spool 220A, which may be lower than the first threshold rotational speed. Accordingly, introduction of fuel at the second threshold rotational speed may result in a second turbine temperature, which may be higher than the first turbine temperature. In some examples, the second turbine temperature may be above the critical turbine temperature. As such, the modification to the ignition sequence during the emergency in-flight restart may reduce the expected lifetime of the engine, by operation at the second turbine temperature. Furthermore, the modification to the ignition sequence may result in increased inspection and/or maintenance upon landing aircraft 101, because EEC 203A may generate a data record indicating that the turbine temperature approached or exceeded the critical turbine temperature. In some examples, EEC 203A may generate the data record based on performance of the restarting operation. However, the increased probability of a successful start of gas turbine engine 202A and/or a faster emergency in-flight restart procedure may provide benefits that outweigh the costs associated with operation at the second temperature.

In some examples, gas turbine engine 202A may be configured to idle at an idling rotational speed and cruise at a cruising rotational speed of HP spool 220A. In some examples, the cruising rotational speed may be in a range of from about 5,000 rpm to about 50,000 rpm. In some examples, the idling rotational speed may be in a range of from about 60% to about 95% of the cruising rotational speed (e.g., about 80% of the cruising rotational speed).

In some examples, the first threshold rotational speed may be set relative to the cruising rotational speed or the idling rotational speed. For example, the first threshold rotational speed may be from about 10% to about 40% of the cruising rotational speed. In some examples, the first threshold rotational speed may be from about 10% to about 40% of the idling rotational speed, such as from about 11% to about 30% of the idling rotational speed. In some examples, the second threshold rotational speed may be at least about 10% lower, such as at least about 15% lower, or at least about 20% lower, than the first threshold rotational speed. As an illustrative example, gas turbine engine 202A may have a design speed (idling, cruising, or the like) of 10,000 rpm. The first threshold rotational speed, at which fuel is introduced during a normal start, may be 3,000 rpm (30% of the design speed). The second threshold rotational speed, at which fuel is introduced during an emergency in-air restart, may be 1,500 rpm (50% lower than the first threshold rotational speed (i.e. 15% of the design speed)).

In some examples, the fuel flow rate may also be modified in accordance with one or more aspects of the current disclosure. For example, EEC 203 may cause fuel to be introduced to combustor 212A from fuel supply 240A at a first initial fuel flow rate during a normal starting operation when the vehicle is on the ground. In some examples, in addition to modifying the timing of the fuel introduction such that fuel is introduced at the second threshold rotational speed, EEC 203A may modify the fuel flow rate, such that fuel is introduced at a second initial fuel flow rate during an emergency in-flight restart. The second initial fuel flow rate may be different than the first initial fuel flow rate. For examples, the second fuel flow rate may be lower than the first flow rate. In this way, the increase in the turbine temperature may be at least partially offset by introducing less fuel. In some examples, modification of the fuel flow rate may cause the air:fuel ratio to remain substantially similar to the air:fuel ratio during a normal, ground start. In some examples, substantially similar or substantially equal, as used herein, comprise values within 10%, or within 20%, of the stated value.

Figure 4:
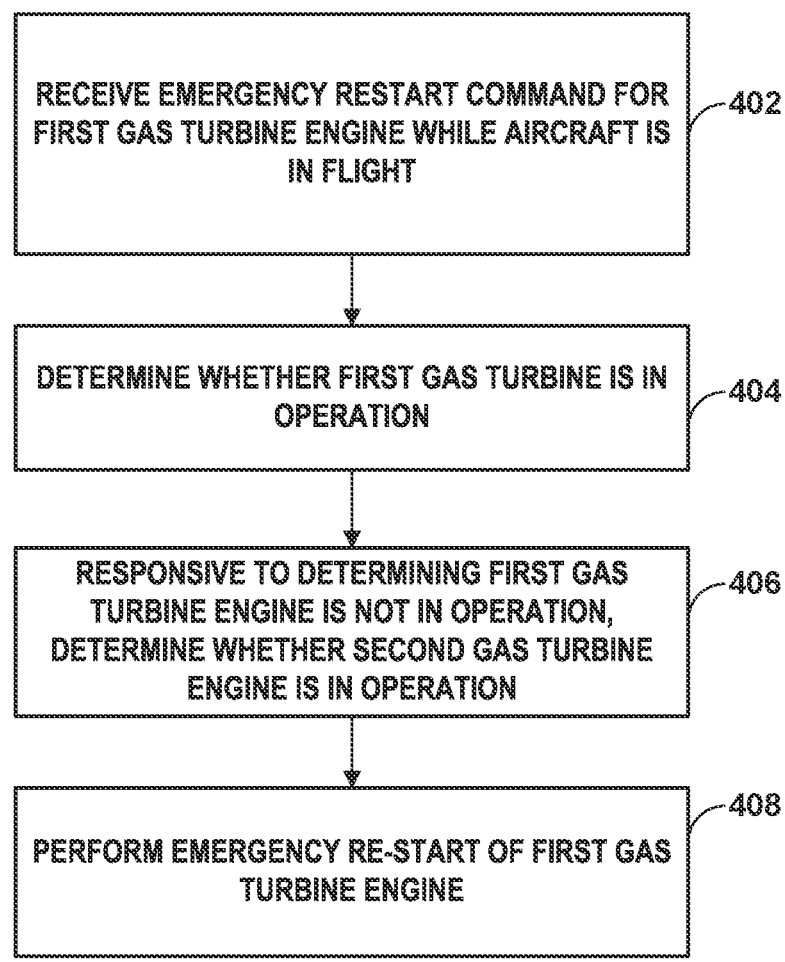
FIG. 4 is a flow diagram illustrating an example technique for restarting a gas turbine engine in-flight, in accordance with one or more aspects of this disclosure.

FIG. 4 is a flow diagram illustrating an example technique for restarting a gas turbine engine in-flight, in accordance with one or more aspects of this disclosure. The technique of FIG. 4 may be performed by one or more components of a system, such as system 100 of FIG. 1 or system 200 of FIGS. 2 and 3. For purposes of this disclosure, the techniques of FIG. 4 will be discussed with reference to aircraft 101 of FIG. 1 and system 200 of FIGS. 2 and 3.

The technique of FIG. 4 includes receiving, by controller 206, an emergency restart command for first gas turbine engine 202A of plurality of gas turbine engines 202 while aircraft 101 is in-flight (402). The technique of FIG. 4 also includes determining, via controller 206, whether first gas turbine engine 202A is in operation (404). In some examples, the determination may be made at least partially based on a speed sensed at speed sensor 221A, a temperature sensed at the inlet of turbine 214A, a power level generated by power turbine 216A, or a combination of these.

The technique of FIG. 4 may include executing the emergency in-flight restart responsive to determining that first gas turbine engine 202A is not in operation. The technique includes determining, via controller 206, whether at least second gas turbine 202B or APU 202C in operation (406).

The technique of FIG. 4 further includes, responsive to receiving the emergency restart command and determining that second gas turbine engine 202B, APU 202C, or both is in operation and that first gas turbine engine 202A is not in operation, performing an emergency restart of first gas turbine 202A by at least simultaneously causing air turbine starter 222A and electric starter 224 to cause rotation of HP spool 220A of first gas turbine engine 202A (408). In this way, ATS 222A may use compressed air sourced external to gas turbine engine 202A, such as bleed air from second gas turbine engine 202B, bleed air from gas turbine engine 202C, compressed air tank 242, or combinations thereof. In some examples, bleed air from second gas turbine engine 202B may be a first air source supplied to ATS 222A, and the technique of FIG. 4 may further include causing delivery of compressed air from a second air source to ATS 222A. In some examples, the second air source include one or more of compressed air tank 242 or APU 202C.

In some examples, the technique of FIG. 4 may further include driving propulsor 204A a spool of gas turbine engine 202A. In some examples, the technique of FIG. 4 may include introducing fuel to combustor 212A with fuel supply system 240A of gas turbine engine 202A at a first threshold rotational speed during a starting operation in which aircraft 101 is on the ground. The technique may further include introducing fuel to combustor 212A at a second threshold rotational speed during a starting operation in which aircraft 101 is in-flight. The second threshold rotational speed may be different (e.g., lower) than the first threshold rotational speed. Thus, introducing fuel to combustor 212A at the first threshold rotational speed may result in a first turbine temperature, and introducing fuel to combustor 212A at the second threshold rotational speed may result in a second turbine temperature. In some examples, the first turbine temperature may be cooler than the second turbine temperature. In some examples, the second threshold rotational speed is at least 10% lower than the first threshold rotational speed.

In some examples, electric starter 224A is configured to receive electrical energy from a generator of second gas turbine engine 202B, a battery, an on-board electrical system, a generator of first gas turbine 202A (generated via windmilling propulsor 204A) or combinations thereof. In some examples, electrical distribution 207 may include a combination of these sources. In any event, in some examples, electric starter 224A may cause rotation of HP spool 220A throughout the emergency in-flight restart to increase the probability of a successful start (e.g., avoid a hung start).

In some examples, gas turbine engine 202A may include HP spool 220A, which both ATS 222A and electric machine 224A may cause to rotate during a starting operation. Gas turbine engine 202A may also include LP spool 218, which may be connected to propulsor 204A. The technique of FIG. 4 may include generating electrical power from a windmilling operation of propulsor 204A. The generated electrical power may be supplied by electrical distribution 207 to electrical machine 224A and used for performing at least part of the emergency in-flight restart of gas turbine engine 202A. In some examples, EEC 203A may command a feathering and/or unfeathering of propulsor 204A. In some examples, responsive to determining that first gas turbine engine 202A is not in operation and aircraft 101 is in-flight, controller 206 may command a feathering of propulsor 204A.

In some examples, the technique of FIG. 4 may include mechanically coupling ATS 222A and electric starter 224A to a start gear of starter connection components 230A. For example, both ATS 222A and electric starter 224 may be mechanically coupled to a first end of a dual-ended start gear.

Figure 5:
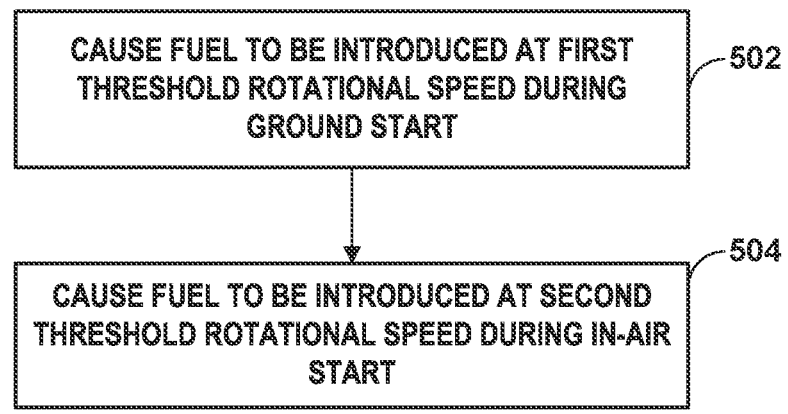
FIG. 5 is a flow diagram illustrating an example technique for restarting a gas turbine engine in-flight, in accordance with one or more aspects of this disclosure.

FIG. 5 is a flow diagram illustrating an example technique for restarting a gas turbine engine in-flight, in accordance with one or more aspects of this disclosure. The technique of FIG. 5 may be performed by one or more components of a system, such as system 100 of FIG. 1 or system 200 of FIG. 2. For purposes of this disclosure, the techniques of FIG. 5 will be discussed with reference to system 200 of FIG. 2.

The technique of FIG. 5 includes causing, with controller 206, fuel to be introduced to combustor 212A with fuel supply system 240A of gas turbine engine 202A at a first threshold rotational speed during a starting operation in which aircraft 101 is on the ground (502). The technique of FIG. 5 further includes causing, via controller 206, fuel to be introduced to combustor 212A at a second threshold rotational speed during a starting operation in which aircraft 101 is in-flight (504). The second threshold rotational speed may be different (e.g., lower) than the first threshold rotational speed. Thus, introducing fuel to combustor 212A at the first threshold rotational speed may result in a first turbine temperature, and introducing fuel to combustor 212A at the second threshold rotational speed may result in a second turbine temperature. In some examples, the second turbine temperature may be higher than the first turbine temperature. In some examples, the first threshold rotational speed is from about 10% to about 40% of a cruising rotational speed. In some examples, the second threshold rotational speed may be at least about 10% lower than the first threshold rotational speed.

In some examples, the second temperature may be above a critical temperature of the gas turbine engine. Thus, operation of the turbine at the second temperature may reduce an expected lifetime of the gas turbine engine. In some examples, the technique of FIG. 5 may include EEC 203A generating, based on performance of the emergency in-flight restarting operation, a data record indicating the turbine temperature approached or exceeded the critical turbine temperature. In this way, the execution of the emergency in-flight restart technique may be marked for follow-up inspection and/or maintenance upon landing.

The technique of FIG. 5 may include introducing, by fuel supply system 240A under the control of EEC 203A, fuel to combustor 212A at a first initial fuel flow rate during a normal starting operation when the vehicle is on the ground. During an emergency in-flight restart, fuel from fuel supply system 240A may be introduced at a second initial fuel flow rate, which may be different than the first initial fuel flow rate. For example, the second fuel flow rate may be lower than the first fuel flow rate.

Figure 6:
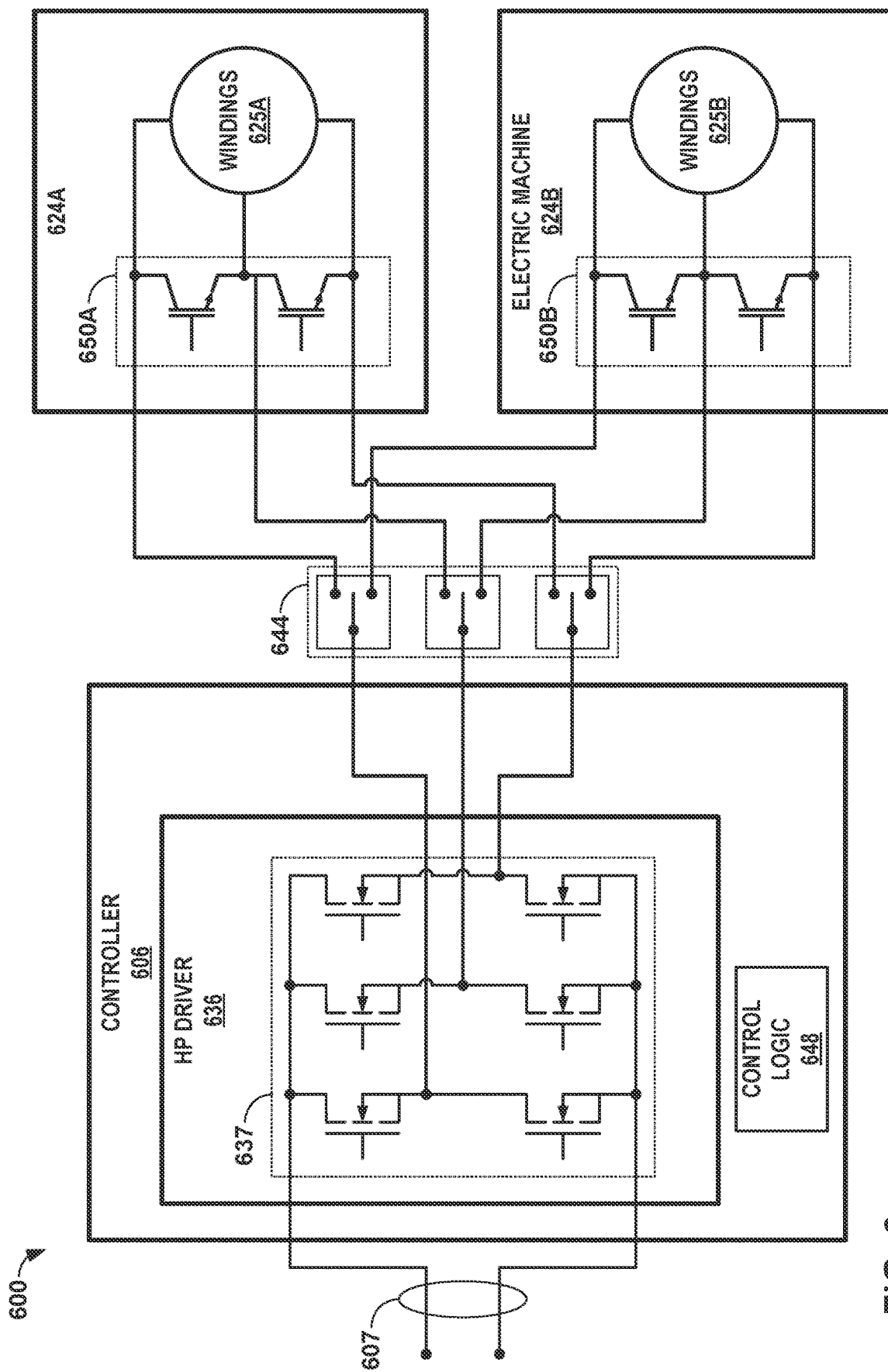
FIG. 6 is a block diagram illustrating further details of example electric starters of gas turbine engines, in accordance with one or more aspects of this disclosure.

FIG. 6 is a schematic diagram illustrating further details of example system 600. System 600 includes a motor controller and electric machines in accordance with one or more aspects of the present disclosure. Controller 606 of FIG. 6 may be an example of controller 206 of FIG. 2 and FIG. 3. Similarly, electric starters 624A and 624B (collectively, "electric starters 624") may be examples of electric starters 224 of FIG. 2 and FIG. 3.

As shown in FIG. 6, HP driver 636 may include power switches 637 that are configured to generate power signals for operating electric starters 624. Power switches 637 may receive DC electrical energy 607, which may represent an output of one or both of an AC/DC converter or a DC/DC converter. Control logic 648 may output signals to gates of switches 637 that cause switches 637 to generate the power signals for operating electric starters 524. As one example, control logic 648 may output signals to gates of power switches 637 that cause power switches 637 to generate a three-phase high power signal for operating electric starters 624.

The power signals generated by power switches 637 may be routed to electric starters 624 via multiplexor 644. In some examples, multiplexor 644 may patch the output of switches 637 to electric starter 624A, electric starter 624B, or be open. As such, in some examples, multiplexor 644 may function as a three-way switch.

As shown in FIG. 6, each of electric starters 624 may include a respective set of windings of windings 625A and 625B (collectively, "windings 625"). In some examples, each of electric starters 624 may each further include one or more power switches 650A and 650B, respectively (collectively "starter power switches 650"). The flow of the power signals generated by power switches 637 and starter power switches 650 through windings 625 may generate magnetic fields, which in turn may induce rotation of rotors of electric starters 624. As noted above, rotation of the rotors may be transferred into a starting shaft of gas turbine engines 202 (e.g., HP spools 220). In this way, switches power switches 637 may generate power signals to cause rotation of HP spools 220 of gas turbine engines 202, which may eventually result in HP spools 220A reaching the threshold rotational speed for introduction of fuel and combustion.

As mentioned above, during an emergency in-flight restart operation, electric starters 624 may be configured to cause rotation of HP spool 220A (FIGS. 2 and 3). In some examples, to increase the probability of a successful start, electric starters 624 may be configured to cause rotation of HP spool 220A (FIGS. 2 and 3) throughout a time period during which the emergency in-flight restart is conducted. The time period may be a duration of time that is from about 1 minute to about 15 minutes long, or from about 2 minutes to about 10 minutes long, or from about 3 minutes to about 7 minutes long, in various examples. During an emergency in-flight restart, power switches 637 may generate the power signal to control electric starters 724 continuously or intermittently throughout the duration of the emergency in-flight restart. Since power switches 637, in most cases, generate thermal energy along with the electric signal due to imperfect efficiency, power switches 637 may increase in temperature while generating the power signal. In some examples, absent cooling mechanisms, power switches 637 may overheat and fail during the emergency in-flight restart.

In accordance with one or more aspects of this disclosure, controller 606 may be provided a thermal energy management system configured to cool controller 606 (e.g., power switches 637) during an emergency in-flight restart operation. In some examples, the thermal energy management system may include a closed-loop cooling system. The closed-loop cooling system may include a cooling fluid reservoir configured to contain cooling fluid. The cooling fluid may be configured to receive thermal energy from controller 606 during the in-flight restart operation. As used herein, the term about N minutes may be interpreted to be N minutes+/−10%.

Figure 7:
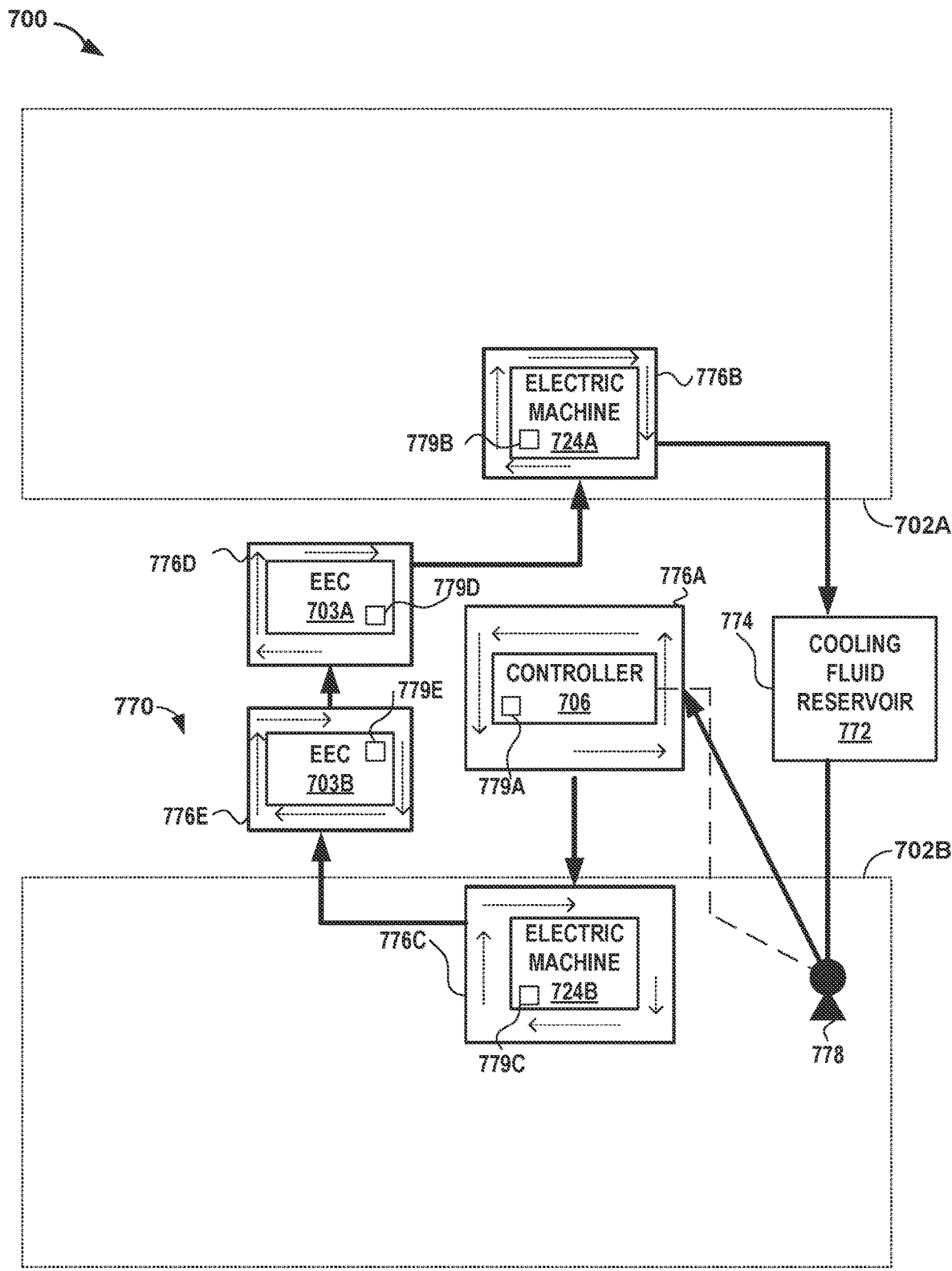
FIG. 7 is a conceptual diagram illustrating the system of FIG. 2 with an example thermal energy management system.

FIG. 7 is a conceptual diagram illustrating example system 700 according to the present disclosure. System 700 of FIG. 7 may be generally described similarly to system 200 of FIGS. 2 and 3, where similar reference numerals indicate like elements. System 700 differs from system 200 as described below. Furthermore, controller 706 may be an example of controller 206 of FIGS. 2 and 3 and/or controller 606 of FIG. 6. Similarly, EECs 703 may be examples of EECs 203 of FIGS. 2 and 3.

System 700, which may also be referred to as the starter system, includes closed-loop cooling system 770 configured to cool electronic components (e.g., power switches) during in emergency in-flight restart of gas turbine engine 702A, gas turbine engine 702B, or both. As illustrated in FIG. 7, some components of gas turbine engines 702 are omitted for clarity.

Closed-loop cooling system 770 includes cooling reservoir 772, pump 778, and jackets 776 at least partially surrounding at least one controller of system 700. Although each of controller 706, electric starters 724, and EECs 703 are illustrated as completely surrounded by jackets 776A, 776B, 776C, 776D, and 776E respectively, it is understood that in some examples one or more of jackets 776 may be omitted, or may only partially surround a component (e.g., a motor controller housing). For example, cooling system 770 may, in some examples, only include jacket 776A surrounding controller 706 and not be configured to circulate cooling fluid to EECs 703 or electric starters 724. In some examples, electric starts 724 may include other cooling features, as will be further described below. It should be noted that although cooling reservoir 772 is illustrated as separate from jacket 776A, in some examples cooling reservoir 772 and cooling jacket 776A may be co-located.

Cooling fluid reservoir 772 is configured to contain cooling fluid, which may be pumped about system 770 by pump 778 and returned to cooling fluid reservoir 772. In some examples, cooling fluid may traverse closed-loop cooling system as a liquid (only illustrated as broken lines flowing through jackets 776, which indicate the flow of cooling fluid), but it is understood that a phase change may be possible. In examples where the cooling fluid is a liquid, the cooling fluid may include a refrigerant (e.g., glycol), or may include engine oil, combinations thereof, or another liquid. In examples where the cooling fluid is an engine or turbine oil, there may be benefits using a liquid used in other systems with the cooling fluid used in closed-loop cooling system 770. Cooling fluid that includes a liquid (e.g., engine oil) may advantageously eliminate the need for an additional fluid within the engine. Furthermore, in examples where the cooling fluid is engine oil, cooling reservoir 772 may be an engine oil reservoir already present on the aircraft, limiting the additional weight of system 770. In some examples, the cooling fluid may be fuel taken from a fuel supply system (240A, FIG. 2) and circulated through jackets 776 and returned to the fuel supply system (240, FIG. 2). In some examples, since close-loop cooling system 770 is configured to operate rarely and for a relatively short duration, using fuel or engine oil as the cooling fluid may be acceptable (i.e., not evaporate the cooling fluid) and may allow for reduced weight of closed-loop cooling system 770.

In some examples, cooling fluid that includes a refrigerant may advantageously remain a liquid throughout a flight (e.g., not freeze or boil). Since closed loop cooling system 770 may only be used during an emergency in-flight restart, and since such situations are rare, it is expected that close-loop cooling system 770 will not be activated for large portions of a flight or even at all during most flights. For this reason, a refrigerant cooling fluid that is resistant to both hot and cold temperature extremes may be desirable.

Closed-loop cooling system 770 may be sized to maintain the temperature of controller 706 and/or other electronic components of system 700 below a critical electronics temperature. The critical electronics temperature, in this case, may be the temperature above which power switches (637, FIG. 6) of controller 706 fail. In some examples, the critical electronics temperatures may be about 150 degrees Celsius, or about 175 degrees Celsius, or about 200 degrees Celsius. Accordingly, cooling fluid system 770 may be sized to include enough cooling fluid to keep power switches (637, FIG. 6) below the critical electronics temperature for the duration of the longest expected emergency in-flight restart operation. In some examples, the emergency in-flight restart may define a maximum amount of thermal energy generated.

The maximum amount of thermal energy generated may be based on the output of electrical energy from controller 706 to electric starters 724 and the longest duration of the time period over which the emergency in-flight restart may be performed. In some examples, closed-loop cooling system 770 may contain a volume of cooling fluid that absorbs a maximum amount of thermal energy (e.g., without changing phase, or without over-pressuring closed-loop cooling system 770). In some examples, the maximum amount of thermal energy generated during the emergency in-flight restart may be substantially equal to the maximum amount of thermal energy that can be absorbed by closed-loop cooling system 770. In this way, power switches (637, FIG. 6) may be protected while closed-loop cooling system 770 adds minimal weight to the aircraft (101, FIG. 1)

In some examples, closed-loop cooling system 770 may be configured to cool components of first gas-turbine 102A and second gas turbine engine 102B. As such, cooling fluid reservoir 772 and/or pump 778 may be located within a tail section of a fuselage of aircraft 101 (FIG. 1) between gas turbine engines 102 disposed on opposing wings, or on opposing sides of the fuselage (105, FIG. 1). In this way, closed-loop cooling system 770 may be configured to serve each gas turbine engine (102A, 102B, FIG. 1) of a plurality of gas turbine engine 102.

Since closed-loop cooling system 770 may only need to receive thermal energy generated during a relatively short time period (e.g., an emergency in-flight restart procedure, closed-loop cooling system 770 may be closed-loop. In some examples, closed-loop cooling system 770 may include a substantially fixed amount of cooling fluid, and not include inlets or outlets for new cooling fluid to be brought in or released from closed-loop cooling system 770 during operation. In this way, the additional weight added by closed-loop cooling system 770 may be minimized while ensuring that the temperature sensitive electronics of the motor controllers (e.g., power switches 637, FIG. 6) are maintained below the temperature at which they may fail. In some examples, closed-loop cooling system 770 may not include a heat exchanger, which may save additional weight.

In some examples, cooling fluid reservoir 772 may be a cooling fluid tank defined by wall 774. In some examples, wall 774 may be flexible and/or stretchable, such that the volume of cooling fluid reservoir 772 may change in response to thermal expansion of cooling fluid contained by cooling fluid reservoir 772. In some examples, as thermal energy generated by controller 706 is received by closed-loop cooling system 770, the cooling fluid may expand. In some examples, at least a portion of wall 774 defining cooling fluid reservoir 772 may include a stretchable polymeric material. In this way, the footprint of closed-loop cooling system 770 may be minimized while the internal cooling fluid is protected from contamination.

In some examples, pump 778 may be controlled by controller 706, as illustrated by the broken line connecting controller 706 and pump 778 in FIG. 7. Controller 706 may cause pump 778 to activate from a non-operating condition to an operating condition during the emergency in-flight restart, and thus cycle cooling fluid about closed-loop cooling system 770 during the emergency in-flight restart. For example, controller 706 may activate pump 778 responsive to determining that gas turbine engine 102A is not in operation. Pump 778 may be any suitable pump, such as a centrifugal pump, gear pump, diaphragm pump, rotary pump, axial flow pump, or the like configured to circulate cooling fluid throughout closed-loop cooling system 770. In some examples, pump 778 may be driven by a 28-volt power supply, which may draw relatively low power and require only a battery small enough to be added to aircraft 101 (FIG. 1). In other examples, power for pump 778 may be supplied by aircraft batteries through electrical distribution (207, FIG. 2).

In some examples, controller 706, electric starters 724, and/or EECs 703 may include a temperature sensor 779 (e.g., temperature sensor 779A housed within controller 706, temperature sensor 779B housed within electric starter 724A, temperature sensor 779C housed within electric starter 724B, temperature sensor 779D housed within EEC 703A, and temperature sensor 779E housed within EEC 703B)). In some examples, controller 706 may be configured to activate pump 778 responsive to any one of temperature sensors 779 approaching or exceeding the critical electronics temperature. For example, pump 778 may be activated by controller 706 responsive to any one of temperature sensors 779 reaching a temperature within about 10%, or about 20%, or about 30% of the critical electronics temperature, when measured on an absolute temperature scale such as Kelvin.

Figure 8:
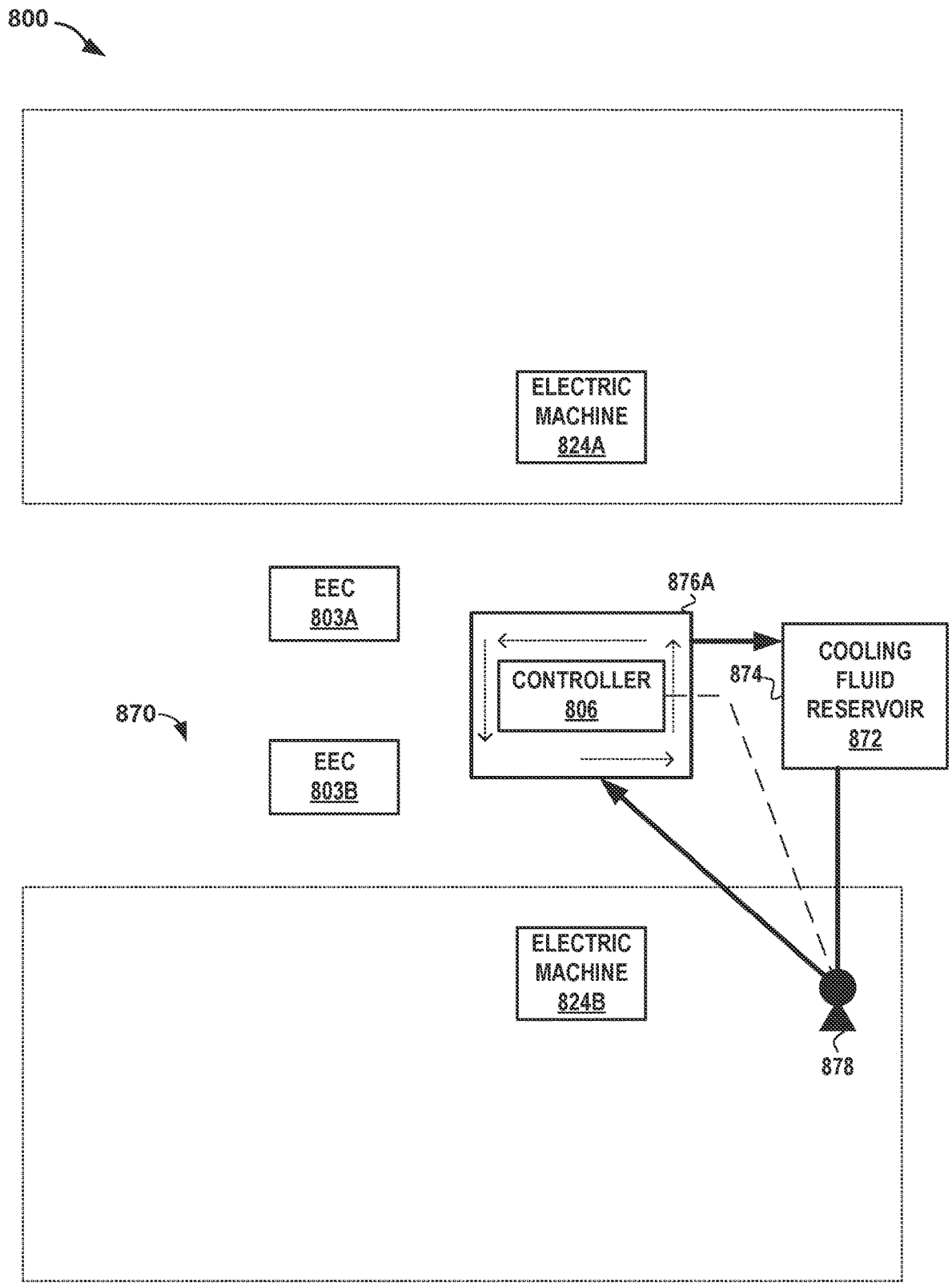
FIG. 8 is a conceptual diagram illustrating the system of FIG. 2 with another example thermal energy management system.

FIG. 8 is a conceptual diagram illustrating example system 800 according to the present disclosure. System 800 of FIG. 8 may be generally described similarly to system 700 of FIG. 7, where similar reference numerals indicate like elements. System 800 differs from system 700 as described below. System 800 includes closed-loop cooling system 870 configured to cool electronic components (e.g., power switches) during in emergency in-flight restart of gas turbine engine 702A, gas turbine engine 702B, or both.

Closed-loop cooling system 870 includes cooling reservoir 872, pump 878, and jacket 876A surrounding controller 806, such that cooling fluid may flow from cooling reservoir 872 defined by wall 874 to jacket 876A to liquid-cool controller 806. As such, controller 806, which may include power switches and be subject to a high thermal load during an emergency restart operation, may be cooled by closed-loop cooling system 870 during the emergency in-air restart to maintain controller 806 below a critical electronics temperature. In some examples, as illustrated, closed-loop cooling system 870 may liquid cool critical electronics components while other components, such as EEC 803A, EEC 803B, electric machine 824A, and/or electric machine 824B, which may not be subject to such a high thermal load during the emergency in-air restart and, may be air-cooled or cooled by another system apart from closed-loop cooling system 872.

Figure 9:
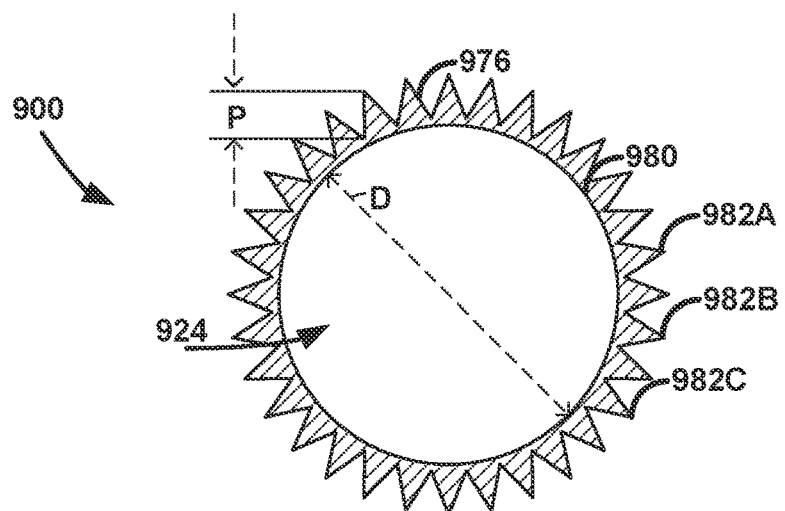
FIG. 9 is a conceptual cross-section diagram of an example electric liquid-cooled electric machine housing according to the present disclosure.

FIG. 9 is a conceptual cross-section diagram of an example electronic machine 924 of system 900, according to one or more aspects of the present disclosure. Electric machine 924 may be an example of electric starters 224 of FIGS. 2 and 3, EECs 203 of FIGS. 2 and 3, or controller 206 of FIGS. 2 and 3. Electric machine 924 is contained within housing 980, with internal components of electric machine 924 omitted for clarity. As mentioned above, in some examples housing 980 may be partially or totally surrounded by jacket 876, such that electric machine 924 may be liquid-cooled by cooling fluid flowing through jacket 976. However, jacket 976 is optional, and housing 980 does not necessarily include a portion of a closed-loop cooling system (770, FIG. 7). In some examples, to remove thermal energy from electric machine 924, housing 980 or a jacket 976 connected thereto may include one or more cooling features configured remove thermal energy from the starter system through convective heat transfer during the emergency in-flight restart. For example, jacket 976 and/or controller housing 980 may include a plurality of fins 982A, 982B, 982C (collectively "fins 982"). Fins 982 may transfer thermal energy generated by electric machine 924 more efficiently and/or quickly to the surroundings of electrical machine 924 than a housing 980 or jacket 976 that does not include fins 982 by increasing the surface area available for heat transfer to the environment.

Since electric machine 924 may be located in a cramped spaced in the tail section of a fuselage (105, FIG. 1), fins 982 may be small relative to a maximum cross-sectional distance of housing 980. For example, fins 982 may protrude a distance P from housing 980. Housing 980 may define a maximum cross-sectional distance D. In some examples, P/D may be less than or equal to about 0.5, or less than or equal to about 0.25, or less than or equal to about 0.1 Fins 982 may be relatively small when compared to conventional heat sink fins, as described, by taking advantage of the natural flow of air in the tail-section of the fuselage, which aids in removing thermal energy. In this way, the footprint of electric machine 924 may be minimized without overheating. In some examples, to further bolster the heat transfer accomplished by fins 982, a portion of one or more surfaces of fins 882 may include a phase-change material (not illustrated). An example phase-change material includes paraffin wax. Phase-change materials such as paraffin wax may improve cooling by continuing to absorb heat from housing 980 throughout the phase change process.

Figure 10:
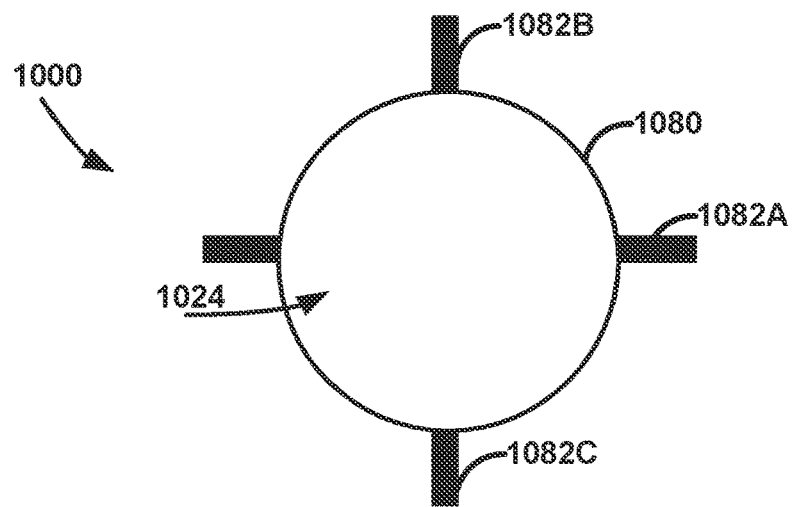
FIG. 10 is a conceptual cross-sectional diagram of an example air-cooled electric machine housing according to the present disclosure.

FIG. 10 is a conceptual cross-section diagram of example electronic machine 1024 of system 1000, according to one or more aspects of the present disclosure. Electric machine 1024 may be an example of electric starters 224 of FIGS. 2 and 3, EECs 203 of FIGS. 2 and 3, or controller 206 of FIGS. 2 and 3. Electric machine 1024 is contained within housing 1080, with internal components of electric machine 1024 omitted for clarity. As mentioned above, in some examples electric machine 1024 may be air-cooled. In such examples, a closed-loop cooling system may not be configured to partially surround housing 1080. In such examples, housing 1080 may include one or more cooling features configured remove thermal energy from the starter system during the emergency in-flight restart. For example, housing 1080 may include a plurality of fins 1082A, 1082B, 1082C (collectively "fins 1082"). Fins 1082 may transfer thermal energy generated by electric machine 924 more efficiently and/or quickly to the surroundings of electrical machine 924 than a housing 980 or jacket 976 that does not include fins 982 by increasing the surface area available for heat transfer to the environment.

Figure 11:
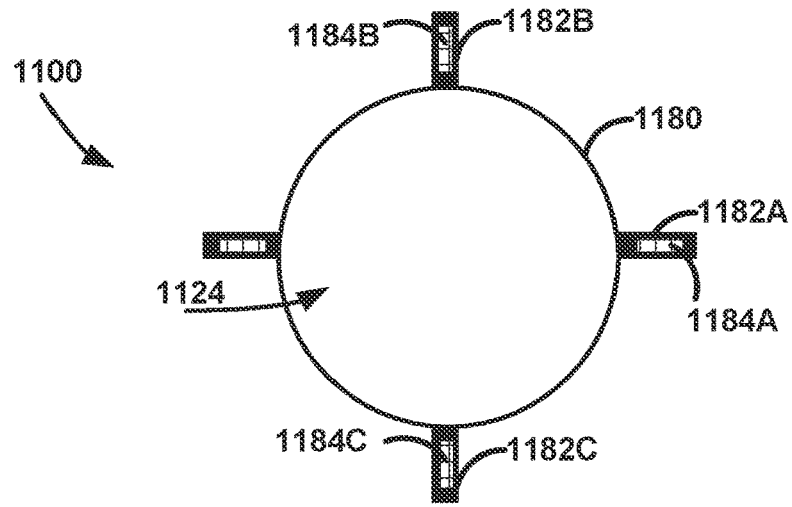
FIG. 11 is a conceptual cross-sectional diagram of an example air-cooled electric machine housing according to the present disclosure that includes hollow fins.

FIG. 11 is a conceptual cross-section diagram of example electronic machine 1124 of system 1100, according to one or more aspects of the present disclosure. Electric machine 1124 may be generally similarly to electric machine 1024 of FIG. 10, differing as described below. In some examples, each of fins 1182A, 1182B, and 1182C may be a hollow fin which includes a respective chamber of chambers 1184A, 1184B, and 1184C. In some examples, chamber 1184A may be at least partially filled with a phase change material (e.g., paraffin wax). Hollow fins 1182 which include phase change material may help to maintain electric machine 1124 within housing 1180 below a critical electronics temperature. Furthermore, the phase change material may be encapsulated within chambers 1184 and prevented from becoming a debris risk if it were to liquify or gasify.

Figure 12:
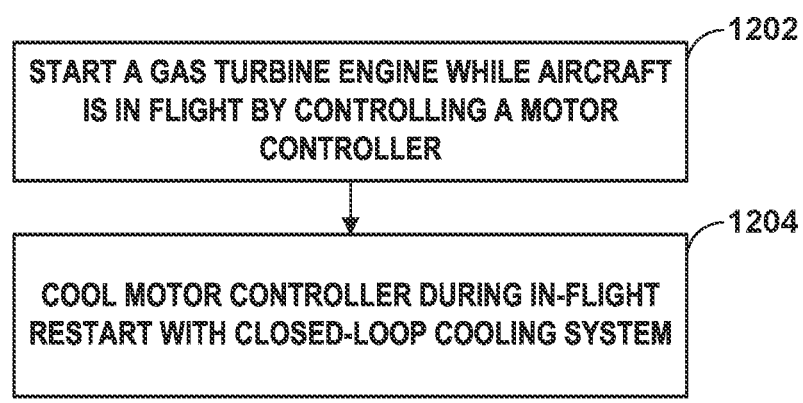
FIG. 12 is a flow diagram illustrating an example technique for managing thermal energy during an in-flight restart, in accordance with one or more examples of the present disclosure.

FIG. 12 is a flow diagram illustrating an example technique for managing thermal energy during an in-flight restart, in accordance with one or more examples of the present disclosure. The technique of FIG. 12 may be performed by one or more components of a system, such as system 100 of FIG. 1 or system 200 of FIGS. 2 and 3, system 600 of FIG. 6, system 700 of FIG. 7, or system 800 of FIG. 8. For purposes of this disclosure, the techniques of FIG. 9 will be discussed with reference to system 700 of FIG. 7 and system 800 of FIG. 8.

The technique of FIG. 12 includes starting first gas turbine engine 102A, which is configured to provide propulsion to aircraft 101 while aircraft 101 is in-flight, by controlling motor controller 606 (1202). Motor controller 606 includes power switches 637. Power switches 637 are configured to generate a power signal to control an electric motor 724 to cause rotation of HP spool 220A to start gas turbine engine 102A. However, power switches 637 may overheat and fail should the temperature of power switches 637 approach or exceed a critical electronics temperature. Since an emergency in-flight restart may take several tries or extend over several minutes, during which time controller 606 and electric motors 724 are generating thermal energy, power switches 637 may be prone to overheat during an emergency in-flight restart if not properly cooled. However, typical cooling systems may undesirably add weight to aircraft 101.

In accordance with one or more aspects of the disclosure, the technique of FIG. 12 includes cooling controller 706 during the in-flight restart with closed-loop cooling system 770 (1204). Closed-loop cooling system 770 includes cooling fluid reservoir 772 containing cooling fluid. The cooling fluid is configured to receive thermal energy from controller 706 during the in-flight restart operation. In some examples, cooling system 770 may be further configured to cool electric starters 724 and/or EECs 703 during the emergency in-flight restart.

In some examples, closed-loop cooling system 770 may be sized to maintain the temperature of controller 706 and/or EECs 703 below a threshold temperature for a time period during which the in-flight restart operation is conducted. The threshold temperature may be a critical electronics temperature, above which power switches 637 within controller 706 and/or EECs 703 may overheat and fail. In some examples, the critical electronics temperature may be about 150 degrees Celsius, or about 175 degrees Celsius, or about 200 degrees Celsius. In some examples, the time period may be from about 1 minute to about 15 minutes in duration, or from about 2 minutes to about 10 minutes in duration, or from about 3 minutes to about 7 minutes in duration. In this way, the volume of cooling fluid (e.g., the volume of cooling fluid reservoir 772) may be selected based on the amount of cooling required to keep the temperature below the critical electronics temperature for the maximum duration of time that it may take to restart gas turbine engine 202A.

In some examples, closed-loop cooling system 770 may add as little weight to aircraft 101 as possible while maintaining power switches 637 below the critical electronics temperature. As such, closed-loop cooling system may be located centrally to reduce required piping. For example, aircraft 101 may include gas turbine engine 102 disposed on opposing sides of fuselage 105. Closed-loop cooling system 770 may be disposed within a tail section of a fuselage disposed between opposing wings of aircraft 101. In some examples, closed-loop cooling system 770 may not include a heat exchanger configured to transfer the thermal energy generated by controller 706 outside of closed-loop cooling system 770, because closed-loop cooling system 770 need only be activated during an emergency in-flight restart, which occurs over a relatively short time period. In this way, the weight added to aircraft 101 by closed-loop cooling system 770 may be minimized by omission of unnecessary equipment.

In some examples, the technique of FIG. 12 may include activating closed-loop cooling system 770 from a non-operating condition to an operating condition during an emergency in-flight restart operation of gas turbine engine 702A. For example, EEC 703A may sense, (e.g., based on a speed, a temperature, a power level, etc. of gas turbine engine 702A) that gas turbine 702A is not in operation. Responsive to determining that gas turbine engine 702A is not in operation, EEC 703A may output a signal to controller 706. Responsive to receiving the signal, controller 706 may activate cooling system 770 (e.g., by causing power to be supplied to pump 778). In some examples, cooling system 770 may be activated responsive to controller 706 determining, based at least partially on a temperature sensed at a temperature sensor 779, that a threshold temperature (e.g., a temperature approaching or exceeding a critical electronics temperature) has been reached in one or more of controller 706, EECs 703, or electric starters 724.

In some examples one or more of controller 706, EECs 703, and/or electric starters 724 may include cooling features configured to emit thermal energy from the starter system into the surroundings, further cooling the starter system. For example, electric machine 824 may include controller housing 880, which may be at least partially surrounded by jacket 876. Jacket 876 may contain cooling fluid, which may be liquid. In some examples, housing 880, jacket 876, or both may define plurality of fins 882, which may increase the surface area for heat transfer relative to a housing 880 or jacket 876 that does not define cooling features. In some examples, which reference to FIG. 11, fins 1182 may be hollow. Hollow fin 1182 may define chamber 1184, which may be at least partially filled with phase change material.

The following numbered examples demonstrate one or more aspects of the disclosure.

Example 1: A system includes a gas turbine engine configured to provide propulsion to an aircraft; a starter system configured to start the gas turbine engine, wherein the starter system comprises a motor controller; and a closed-loop cooling system configured to cool the motor controller during an emergency in-flight restart operation of the gas turbine engine, wherein the closed-loop cooling system includes a cooling fluid reservoir containing cooling fluid, wherein the cooling fluid is configured to receive thermal energy from the motor controller during the emergency in-flight restart operation of the gas turbine engine.

Example 2: The system of example 1, wherein: the motor controller includes power switches, the power switches being configured to generate a power signal to control an electric machine configured to start the gas turbine engine, the power switches generate heat while generating the power signal, and the closed-loop cooling system is configured to cool the power switches during the emergency in-flight restart.

Example 3: The system of any of examples 1 and 2, wherein: the closed-loop cooling system is sized to absorb a maximum amount of thermal energy, and wherein the maximum amount of thermal energy is substantially equal to the maximum amount of thermal energy that can be generated during the emergency in-flight restart.

Example 4: The system of any of examples 2 and 3, wherein: the closed-loop cooling system is configured to keep the power switches at or below a critical electronics temperature during the emergency in-flight restart, and the critical electronics temperature is about 175 degrees Celsius.

Example 5: The system of any of examples 3 and 4, wherein a time period during which the emergency in-flight restart is conducted is from about 1 minute to about 15 minutes in duration.

Example 6: The system of any of examples 1 through 5, wherein the gas turbine engine is a first gas turbine engine attached to a first side of a fuselage of the aircraft, wherein the system further comprises a second gas turbine engine disposed on a second side of the fuselage opposite the first side, and wherein the closed-loop colling system is disposed within a tail section of the fuselage.

Example 7: The system of any of examples 1 through 6, wherein the closed-loop cooling system does not include a heat exchanger configured to transfer the thermal energy generated by the motor controller outside of the closed-loop cooling system.

Example 8: The system of any of examples 1 through 7, wherein the closed-loop cooling system comprises a liquid cooling fluid, and wherein the closed-loop cooling system includes a cooling fluid pump.

Example 9: The system of example 8, wherein the liquid cooling fluid includes at least one of glycol or engine oil.

Example 10: The system of any of examples 8 and 9, wherein the cooling fluid pump is driven by a 28-volt power supply.

Example 11: The system of any of examples 1 through 10, wherein at least a portion of a wall of the cooling fluid reservoir is configured to flex to change shape.

Example 12: The system of any of examples 8 through 11, further comprising a controller configured to activate the closed-loop cooling system from a non-operating condition to an operating condition during the restart operation of the gas turbine engine.

Example 13: The system of example 12, further comprising a temperature sensor, wherein the controller is configured to activate the closed-loop cooling system based at least partially on the temperature sensor sensing a critical electronics temperature.

Example 14: The system of any of examples 12 and 13, wherein the controller is configured to activate the closed-loop cooling system responsive to determining that the gas turbine engine is not in operation.

Example 15: The system of any of examples 12 through 14, wherein the motor comprises one or more cooling fins to remove thermal energy from the starter system through convective heat transfer.

Example 16: The system of example 15, wherein at least one cooling fin of the one or more cooling fins comprises a phase change material on at least one surface of the fin, the phase change material configured to absorb thermal energy by changing phases from a solid to a liquid during the emergency in-flight restart.

Example 17: The system of any of examples 2 through 16, wherein the motor is at least partially surrounded by a jacket configured to contain the cooling fluid.

Example 18: A method includes starting a gas turbine engine configured to provide propulsion to an aircraft while the aircraft is in-flight by controlling a motor controller; and cooling the motor controller with a closed-loop cooling system during an emergency in-flight restart operation of the gas turbine engine, wherein the closed-loop cooling system includes a cooling fluid reservoir containing cooling fluid, wherein the cooling fluid is configured to receive thermal energy from the motor controller during the emergency in-flight restart operation of the gas turbine engine.

Example 19: The method of example 18, further comprising; generating, by power switches of the motor controller, a power signal to control an electric machine to start the gas turbine engine, wherein the power switches increase in temperature while generating the power signal, and wherein the closed-loop cooling system cools the power switches during the emergency in-flight restart.

Example 20: The method of any of examples 18 and 19, wherein cooling the motor controller during the emergency in-flight restart operation comprises cooling the motor controller for a time period that is from about 1 minute to about 15 minutes in duration.

Example 21: The method of any of examples 18 through 20, further comprising activating the closed-loop cooling system from a non-operating condition to an operating condition during the restart operation of the gas turbine engine.

Example 22: The method of example 21, wherein activating the closed-loop cooling system is based at least partially on a temperature sensor sensing a critical electronics temperature.

Example 23: The method of any of examples 18 through 22, further comprising activating the closed-loop cooling system responsive to determining that the gas turbine engine is not in operation.

Various examples have been described. These and other examples are within the scope of the following claims.

What is claimed is:
1. A system comprising:
a gas turbine engine configured to provide propulsion to an aircraft;
a starter system configured to start the gas turbine engine, wherein the starter system comprises a motor controller; and
a closed-loop cooling system configured to cool the motor controller during an emergency in-flight restart operation of the gas turbine engine, wherein the closed-loop cooling system includes a cooling fluid reservoir containing cooling fluid, wherein the cooling fluid is configured to receive thermal energy from the motor controller during the emergency in-flight restart operation of the gas turbine engine,
wherein the closed-loop cooling system does not include a heat exchanger configured to transfer thermal energy generated by the motor controller outside of the closed-loop cooling system.

2. The system of claim 1, wherein:
the motor controller includes power switches, the power switches being configured to generate a power signal to control an electric machine configured to start the gas turbine engine,
the power switches generate heat while generating the power signal, and
the closed-loop cooling system is configured to cool the power switches during the emergency in-flight restart.

3. The system of claim 1, wherein:
the closed-loop cooling system is sized to absorb a maximum amount of thermal energy, and
wherein the maximum amount of thermal energy is substantially equal to the maximum amount of thermal energy that can be generated during the emergency in-flight restart.

4. The system of claim 2, wherein:
the closed-loop cooling system is configured to keep the power switches at or below a critical electronics temperature during the emergency in-flight restart, and
the critical electronics temperature is about 175 degrees Celsius.

5. The system of claim 3, wherein a time period during which the emergency in-flight restart is conducted is from about 1 minute to about 15 minutes in duration.

6. The system of claim 1, wherein the closed-loop cooling system comprises a liquid cooling fluid, and wherein the closed-loop cooling system includes a cooling fluid pump.

7. The system of claim 6, wherein the liquid cooling fluid includes at least one of glycol or engine oil.

8. The system of claim 6, wherein the cooling fluid pump is driven by a 28- volt power supply.

9. The system of claim 1, wherein at least a portion of a wall of the cooling fluid reservoir is configured to flex to change shape.

10. The system of claim 6, further comprising a controller configured to activate the closed-loop cooling system from a non-operating condition to an operating condition during the emergency in-flight restart operation of the gas turbine engine.

11. The system of claim 10, further comprising a temperature sensor, wherein the controller is configured to activate the closed-loop cooling system based at least partially on the temperature sensor sensing a critical electronics temperature.

12. The system of claim 10, wherein the controller is configured to activate the closed-loop cooling system responsive to determining that the gas turbine engine is not in operation.

13. The system of claim 10, wherein the motor controller comprises one or more cooling fins to remove thermal energy from the system through convective heat transfer.

14. The system of claim 13, wherein at least one cooling fin of the one or more cooling fins comprises a phase change material on at least one surface of the fin, the phase change material configured to absorb thermal energy by changing phases from a solid to a liquid during the emergency in-flight restart.

15. The system of claim 2, wherein the motor controller is at least partially surrounded by a jacket configured to contain the cooling fluid.

16. A method comprising:
starting a gas turbine engine configured to provide propulsion to an aircraft while the aircraft is in-flight by controlling a motor controller; and
cooling the motor controller with a closed-loop cooling system during an emergency in-flight restart operation of the gas turbine engine, wherein the closed-loop cooling system includes a cooling fluid reservoir containing cooling fluid, wherein the cooling fluid is configured to receive thermal energy from the motor controller during the emergency in-flight restart operation of the gas turbine engine, and wherein the closed-loop cooling system does not include a heat exchanger configured to transfer thermal energy generated by the motor controller outside of the closed-loop cooling system.

17. The method of claim 16, further comprising;
generating, by power switches of the motor controller, a power signal to control an electric machine to start the gas turbine engine,
wherein the power switches increase in temperature while generating the power signal, and
wherein the closed-loop cooling system cools the power switches during the emergency in-flight restart.

18. The method of claim 16, wherein cooling the motor controller during the emergency in-flight restart operation comprises cooling the motor controller for a time period that is from about 1 minute to about 15 minutes in duration.

19. The system of claim 1, wherein the cooling fluid is configured to remain a liquid throughout a flight.

* * * * *